United States Patent
Nakamura et al.

(10) Patent No.: US 8,928,919 B2
(45) Date of Patent: Jan. 6, 2015

(54) COMPUTER-READABLE MEDIUM STORING IMAGE PROCESSING PROGRAM AND IMAGE PROCESSING APPARATUS

(71) Applicant: Brother Kogyo Kabushiki Kaisha, Nagoya-shi, Aichi-ken (JP)

(72) Inventors: Tomoki Nakamura, Kasugai (JP); Masahiro Fujishita, Nagoya (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 13/849,440

(22) Filed: Mar. 22, 2013

(65) Prior Publication Data
US 2014/0092427 A1    Apr. 3, 2014

(30) Foreign Application Priority Data
Sep. 28, 2012   (JP) .................. 2012-215803

(51) Int. Cl.
 G06F 15/00    (2006.01)
 G06K 15/02    (2006.01)
 G06F 3/12    (2006.01)

(52) U.S. Cl.
 CPC ............ *G06K 15/025* (2013.01); *G06F 3/1292* (2013.01); *G06F 3/1253* (2013.01); *G06F 3/1205* (2013.01); *G06F 3/1256* (2013.01)
 USPC ........................................ 358/1.15

(58) Field of Classification Search
 USPC ........................................ 358/1.15
 See application file for complete search history.

(56) References Cited

U.S. PATENT DOCUMENTS

| | | |
|---|---|---|
| 2003/0056178 A1 | 3/2003 | Sato |
| 2003/0147097 A1 | 8/2003 | Kotani et al. |
| 2005/0168779 A1* | 8/2005 | Tsue et al. ............. 358/1.18 |
| 2007/0177803 A1 | 8/2007 | Elias et al. |
| 2007/0245236 A1* | 10/2007 | Lee .......................... 715/530 |
| 2008/0316526 A1 | 12/2008 | Matsuzaki et al. |

(Continued)

FOREIGN PATENT DOCUMENTS

| | | |
|---|---|---|
| JP | 2003-231323 A | 8/2003 |
| JP | 2008-182496 A | 8/2008 |

(Continued)

OTHER PUBLICATIONS

Office Action issued in related U.S. Appl. No. 13/849,421, mailed Apr. 11, 2014.

*Primary Examiner* — Saeid Ebrahimi Dehkordy
(74) *Attorney, Agent, or Firm* — Merchant & Gould PC

(57) ABSTRACT

There is provided a computer-readable medium allowing a computer of an image processing apparatus to execute: an image-obtain processing; a display-control processing of allowing a display screen to display at least images which are a part of a plurality of images based on the obtained image data; and a selection-judgment processing of judging whether or not selection of one image is received in a state that the images are displayed on the display screen; wherein in a case that the computer judges in the selection-judgment processing that the selection of the one image is received, the computer allows in the display-control processing the display screen to display another image in which the one image is rotated by a predetermined angle, instead of the one image, in a state that output aspect of another image included in the images and different from the one image is maintained.

12 Claims, 18 Drawing Sheets

(56) References Cited

U.S. PATENT DOCUMENTS

| | | | |
|---|---|---|---|
| 2009/0296119 A1* | 12/2009 | Kurihara | 358/1.9 |
| 2010/0134425 A1 | 6/2010 | Storrusten | |
| 2010/0251167 A1 | 9/2010 | DeLuca et al. | |
| 2010/0333044 A1 | 12/2010 | Kethireddy | |
| 2012/0019863 A1 | 1/2012 | Sensu et al. | |
| 2012/0079375 A1* | 3/2012 | Ogino et al. | 715/274 |
| 2012/0262747 A1 | 10/2012 | Saito | |
| 2014/0092426 A1 | 4/2014 | Fujishita et al. | |

FOREIGN PATENT DOCUMENTS

| | | |
|---|---|---|
| JP | 2012-028955 A | 2/2012 |
| JP | 2012-085297 A | 4/2012 |
| JP | 2014-71568 A | 4/2014 |

* cited by examiner

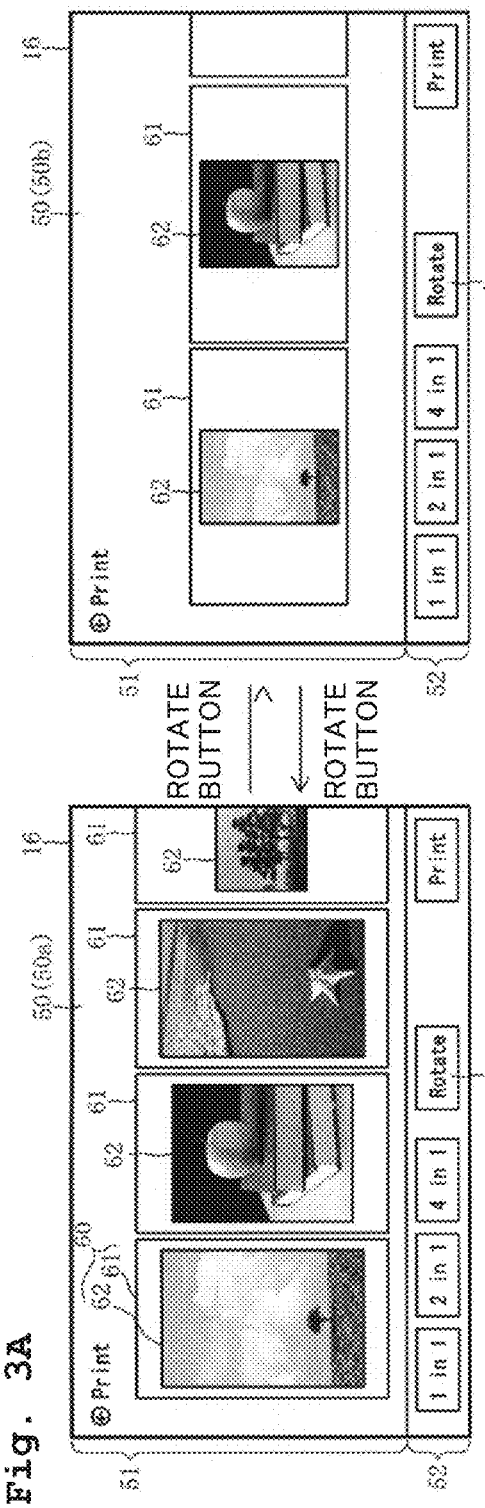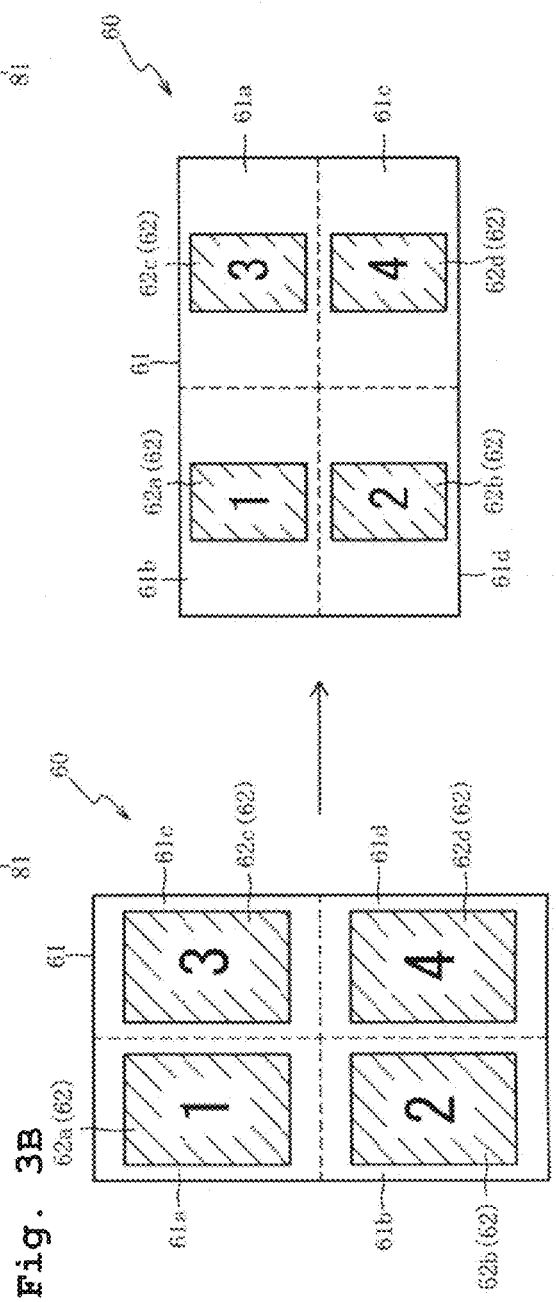
Fig. 3A
Fig. 3B

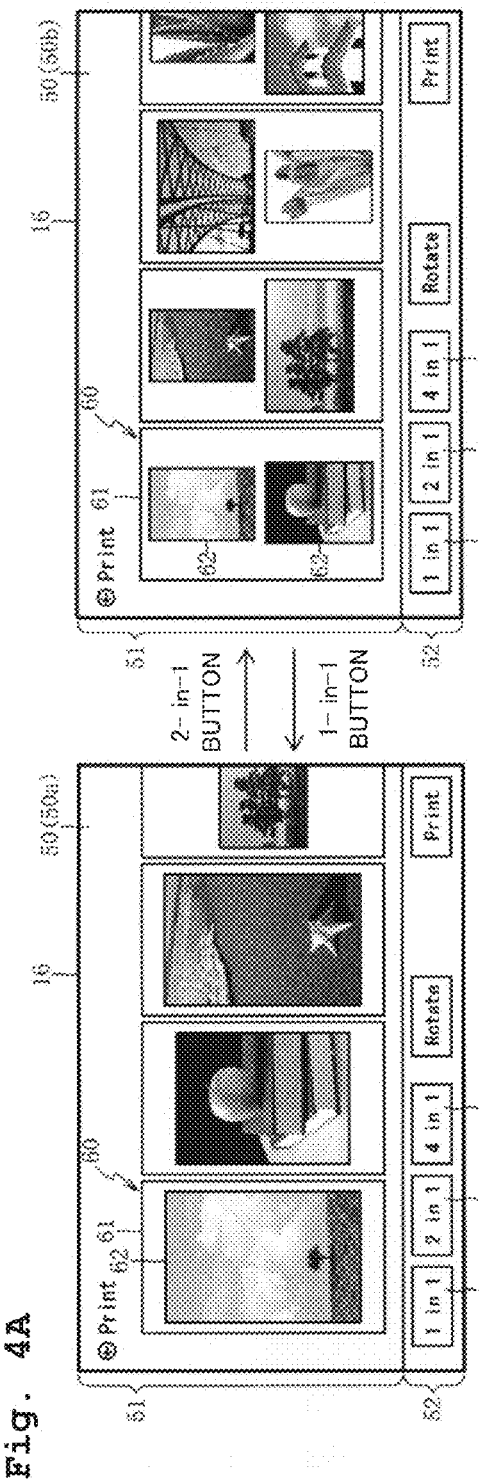
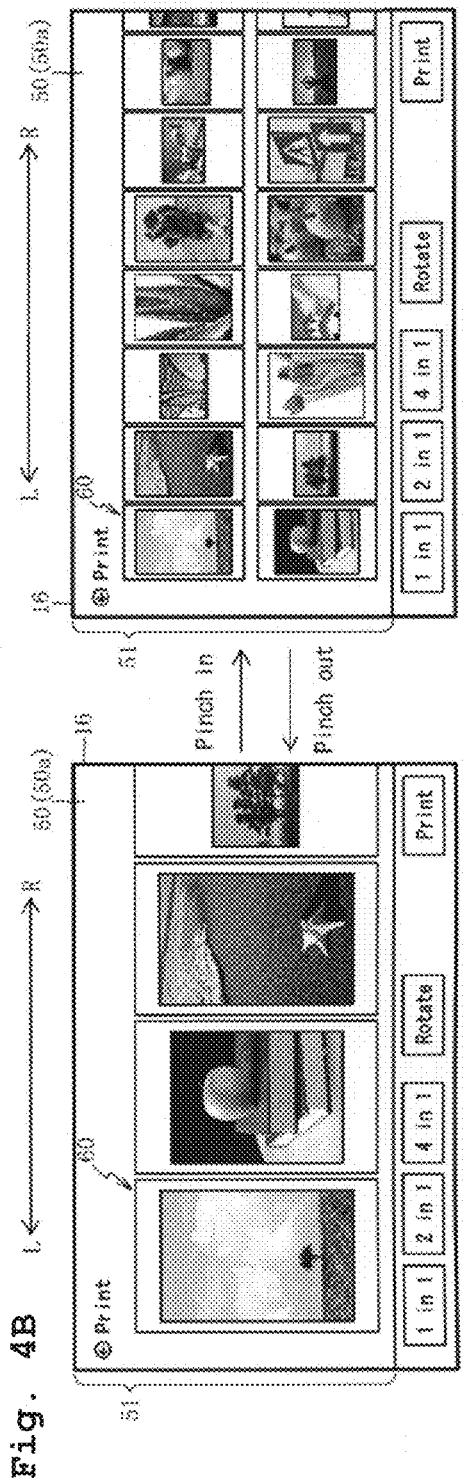
Fig. 4A
Fig. 4B

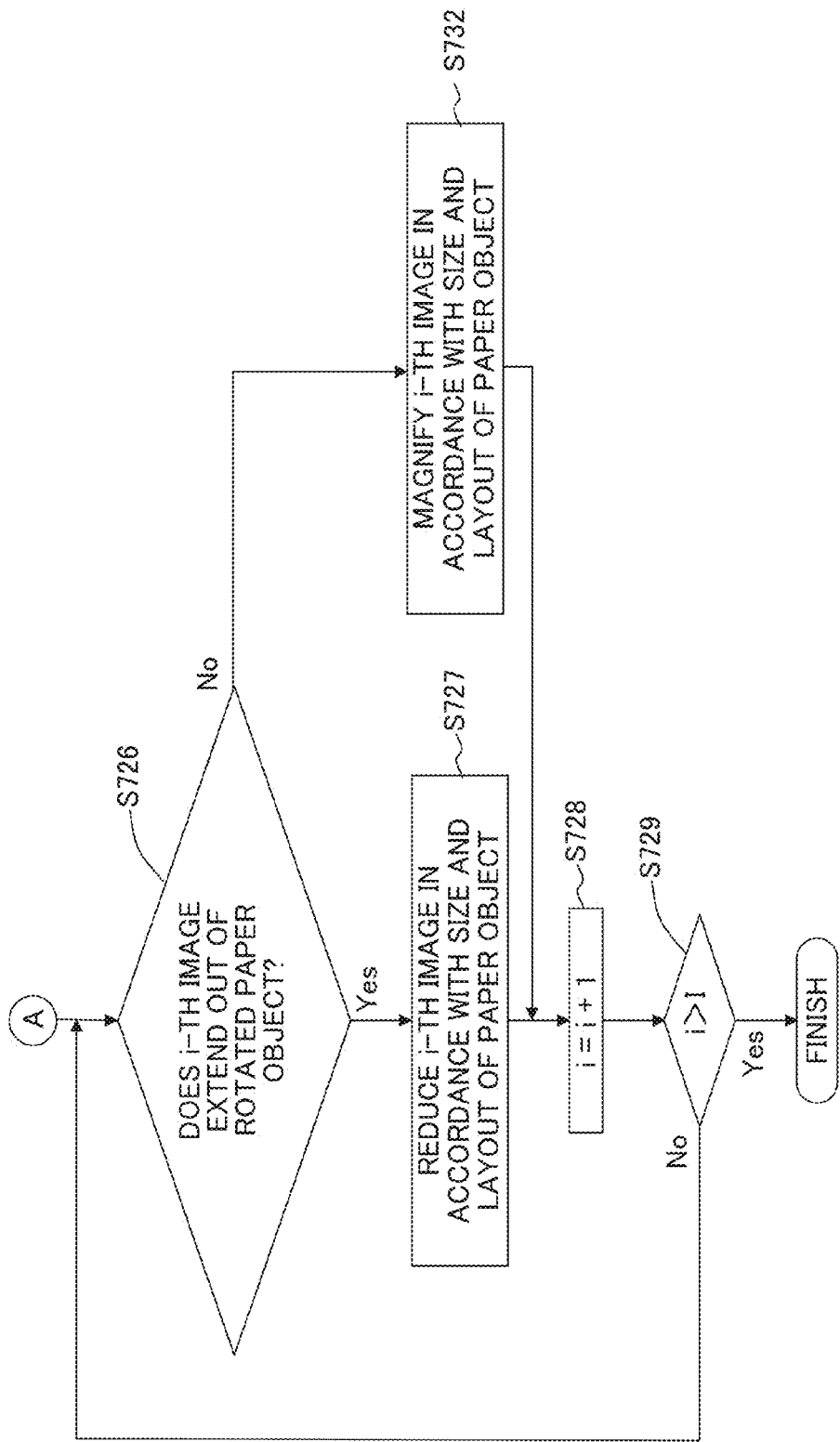

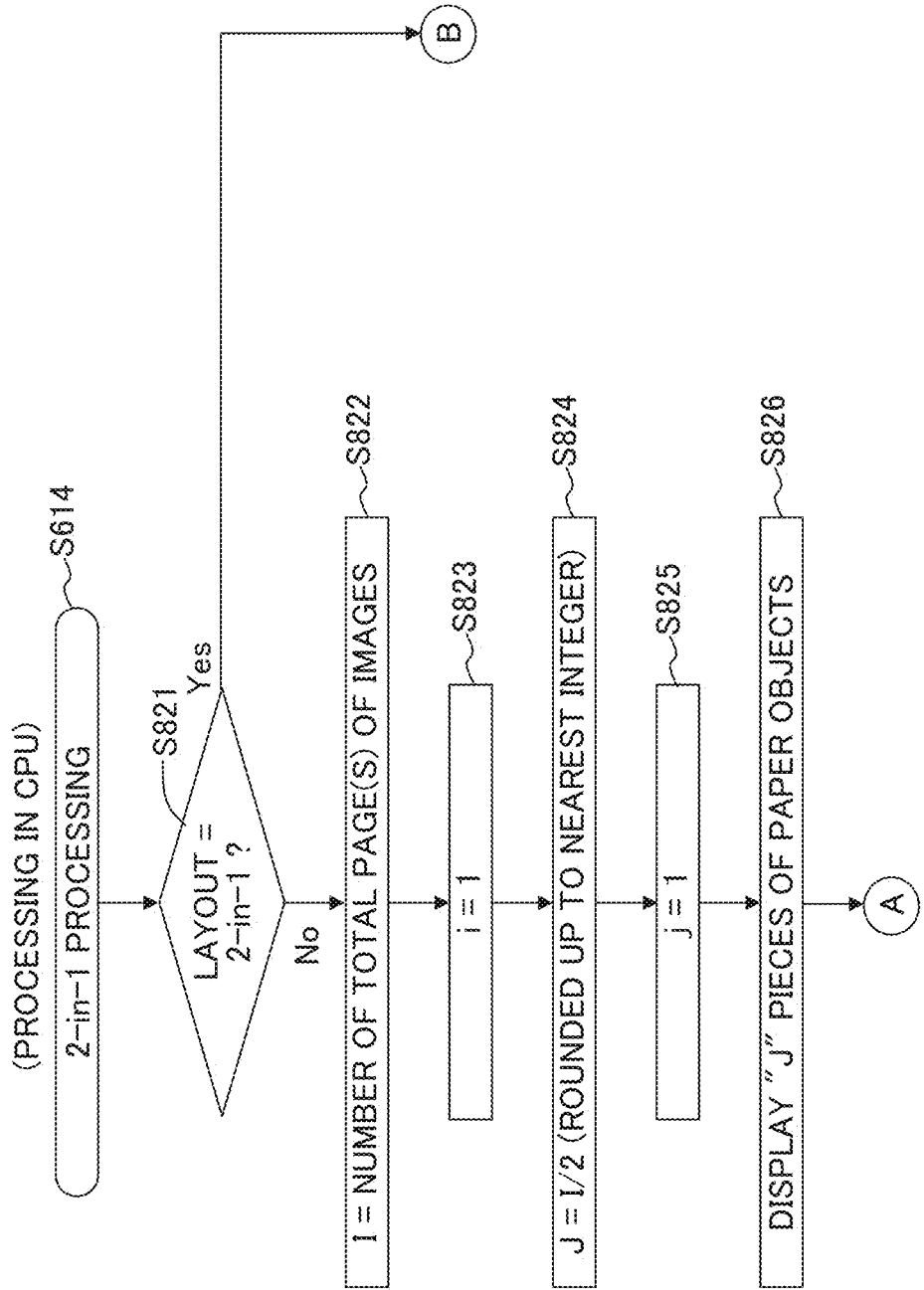

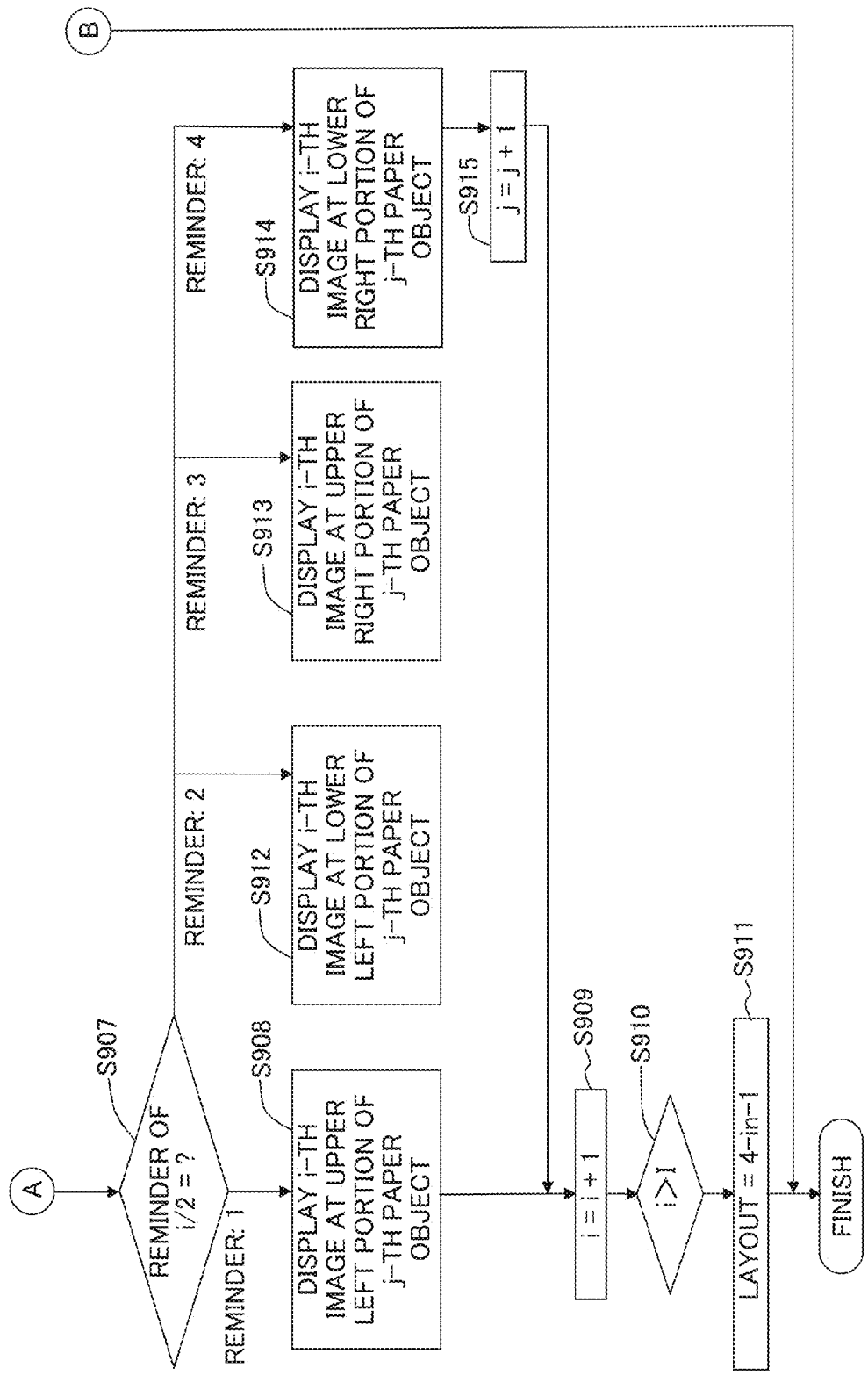

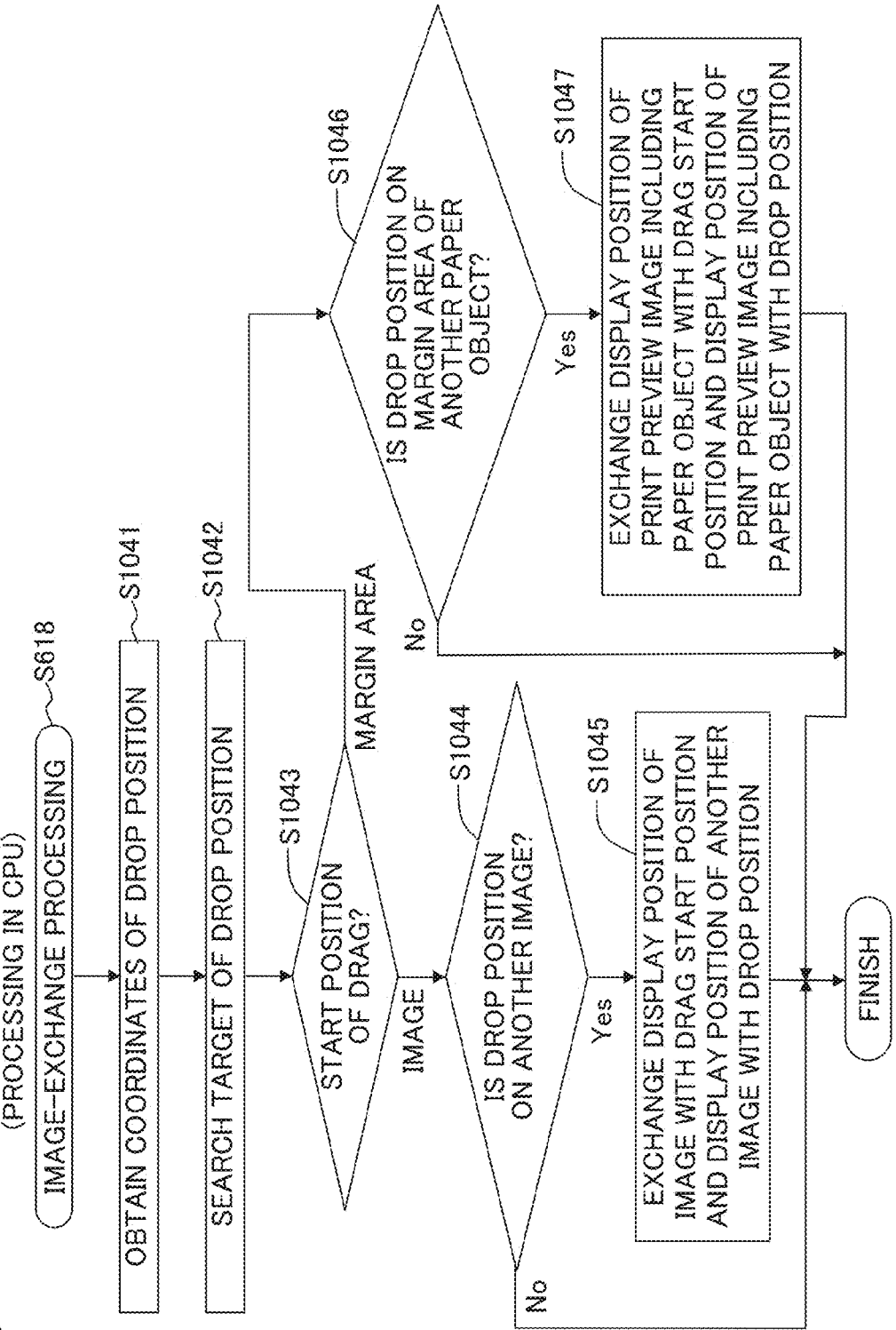

COMPUTER-READABLE MEDIUM STORING IMAGE PROCESSING PROGRAM AND IMAGE PROCESSING APPARATUS

CROSS REFERENCE TO RELATED APPLICATION

The present application claims priority from Japanese Patent Application No. 2012-215803 filed on Sep. 28, 2012 the disclosure of which is incorporated herein by reference in its entirety.

BACKGROUND OF THE INVENTION

1. Field of the Invention

The present invention relates to a computer-readable medium storing an image processing program, and an image processing apparatus.

2. Description of the Related Art

Conventionally, there is known an image processing apparatus which performs, via an operation by a user, a print setting regarding printing of a plurality of images as object to be printed, such as a layout setting of the images with respect to a print paper, while displaying a print preview image based on the plurality of images as the object to be printed.

For example, there is known an image forming apparatus wherein when a user selects one image among images displayed on a print preview window, a simple edit screen regarding the selected one image is displayed in accordance with the user's selection; and when the user selects a rotate button in the simple edit screen, the one image is displayed in a rotated state, in accordance with the user's selection of the rotate button.

SUMMARY OF THE INVENTION

In such an image processing apparatus described above, however, it is necessary for the user to perform both of an operation for selecting an image to be rotated as the rotation object and an operation for instructing rotating the image, such as selection of the rotate button, so as to rotate the one image displayed on the print preview window. Further, in the above-described image processing apparatus, only the image selected by the user as the rotation object is displayed on the simple edit screen; and thus, for example, in a case that a plurality of images are arranged and printed on one sheet of print paper, it is necessary to close the simple edit screen and to return to the print preview window so as to confirm the effect brought about by rotating one image among the plurality of images with respect to one sheet of print paper on which the plurality of images are arranged and exerted to other image different from the one rotated image, which in turn results in unsatisfactory operability.

The present teaching has been made in view of the above-described situation, and an object of the present teaching is to provide a computer-readable medium storing a an image processing program and an image processing apparatus capable of improving the operability when rotating one image among a plurality of images on a screen on which output aspects of the plurality of images can be edited.

According to an aspect of the present teaching, there is provided a non-transitory computer-readable medium storing an image processing program executable by a computer of an image processing apparatus including a display section configured to display a display screen on which output aspects of a plurality of images are editable, the image processing program including allowing the computer to execute:

an image-obtain processing of obtaining a plurality of image data of a plurality of images;

a display-control processing of allowing the display screen to display images which are at least a part of the plurality of images based on the plurality of image data obtained by the image-obtain processing; and a selection-judgment processing of judging whether or not selection of one image among the images is received in a state that the images are displayed on the display screen by the display-control processing;

wherein in a case that the computer judges by the selection-judgment processing that the selection of the one image is received, the computer allows, in the display-control processing, the display screen to display another image in which the selected one image is rotated by a predetermined angle, instead of the one image which has been displayed on the display screen, in a state that output aspect of another image included in the images and different from the one image is maintained.

Note that the present teaching can be configured as various aspects such as an image processing apparatus, a controller controlling image processing apparatus, an image processing system, an image processing method, a recording medium storing image processing program, etc.

According to the image processing program, in a state that at least images which are a part of the plurality of images based on the plurality of image data obtained by the image-obtain processing are displayed on the display screen on which output aspects of the images are editable and in a case that selection of one image among the images is judged to be received, another image in which the one image, regarding that the selection has been received, is rotated by a predetermined angle, instead of the one image which has been previously displayed on the display screen, is displayed on the display screen in a state that output aspect of another image included in the images and different from the one image is maintained. Accordingly, when a user selects one image among the images on the display screen on which the output aspects of the images are editable, the user can rotate the one image only by a predetermined angle while maintaining the output aspect of another image included in the images and different from the one image, without performing any other operation. This consequently provides an excellent operability when selectively rotating one image among the images.

BRIEF DESCRIPTION OF THE DRAWINGS

FIGS. 3A and 3B are views explaining an operation for changing the orientation of a print paper.

FIGS. 4A and 4B are views explaining an operation for changing a layout and an operation for magnifying or reducing a print preview image, respectively.

FIGS. 7A, 7B and 7C are view schematically explaining the outline of a second embodiment in the present teaching.

FIGS. 8A, 8B and 8C are flowcharts showing a wrap-printing processing of a second embodiment.

FIGS. 9A and 9B are flowcharts showing the wrap-printing processing of the second embodiment.

FIGS. 10A, 10B and 10C are flowcharts showing the wrap-printing processing of the second embodiment.

DESCRIPTION OF THE PREFERRED EMBODIMENTS

Figure 1:
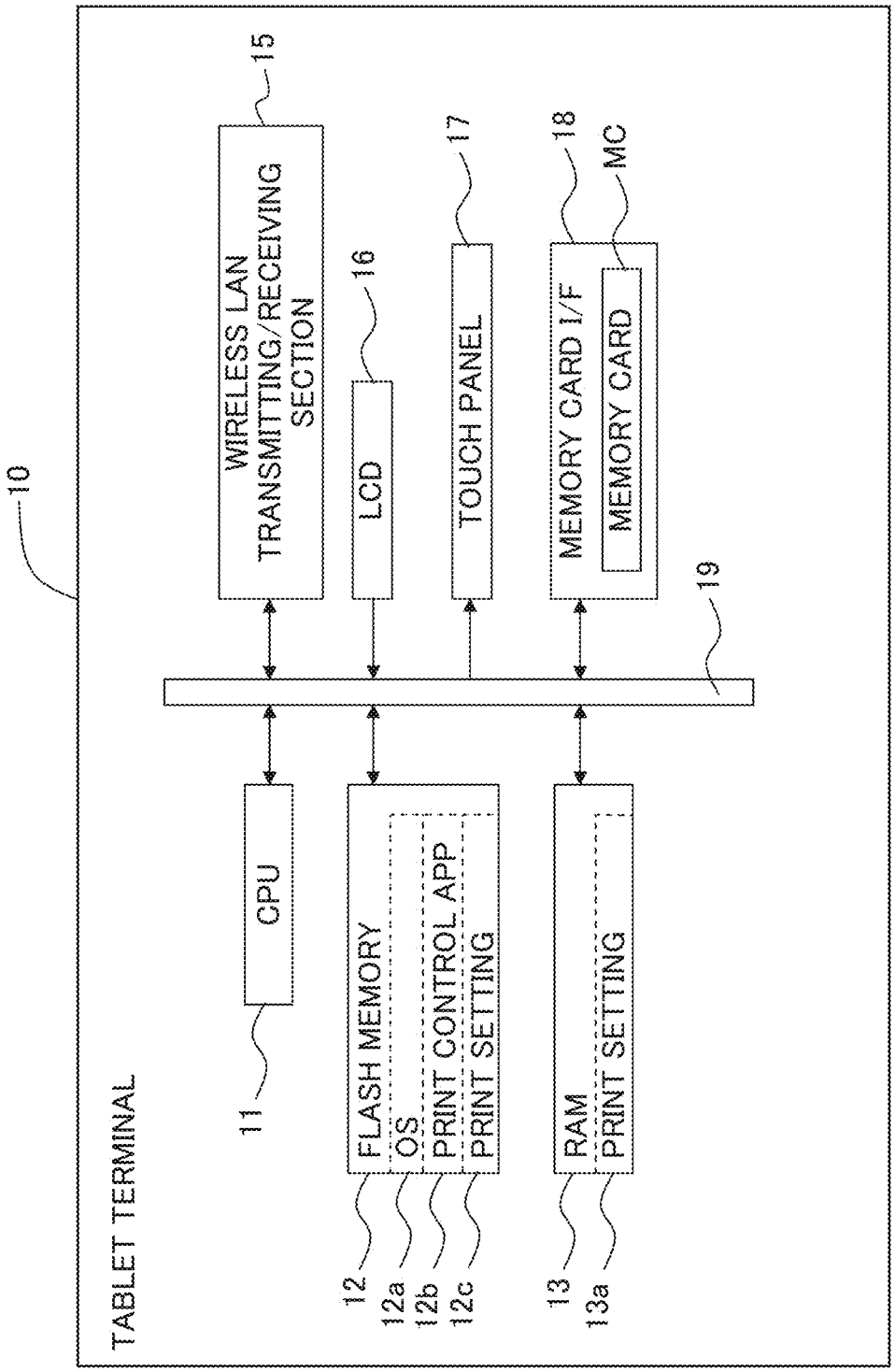
FIG. 1 is a block diagram showing the configuration of a tablet terminal installed with a print control application 12b.

In the following, a preferred embodiment of the present teaching will be explained with reference to the drawings. The print control application 12b (hereinafter referred to as "print control app 12b") of the embodiment is configured as a program via which a user is capable of changing printing layout, orientation of image, orientation of print paper, position of image, etc., by easy and intuitive operation, while confirming a print preview image displayed on a preview screen of a tablet terminal 10.

The tablet terminal 10 is provided with a CPU 11, a flash memory 12, a RAM 13, a wireless LAN transmitting/receiving section 15, a LCD 16, a touch panel 17, and a memory card interface (memory card I/F) 18. These components or parts are connected to one another via a bus line 19.

The CPU 11 controls the respective components connected to the bus line 19 in accordance with a fixed value and/or a program, etc., stored in the flash memory 12, etc. The flash memory 12 is a rewritable, non-volatile memory. The flash memory 12 stores an operating system 12a (hereinafter referred to as "OS 12a"), the print control app 12b, and a print setting 12c. In the following, the CPU 11 executing a program such as the application, the operating system, etc. is described simply as the name of program in some cases. For example, the term "application" means the "CPU 11 executing the application" in some cases. The OS 12a is the basic software realizing the standard function of the tablet terminal 10. In the embodiment, "Windows 8" (trade name) is used as the OS 12a. Note that "Windows 8" (trade name) is merely an example of the OS 12a, and any arbitrary OS may be adopted as the OS 12a, as necessary.

The print control app 12b is an application provided by a vendor of a device such as a printer, a multi-function machine having a printing function, etc.,; and the print control app 12b is installed to the tablet terminal 10 by an user, thereby making it possible to utilize the device from the tablet terminal 10. For example, the print control app 12b makes it possible to perform printing by a printer (not shown) directly from the tablet terminal 10, not via a personal computer, for example. The print control app 12b of the embodiment is configured so as to make it possible, on a preview screen, to change the layout of a print preview image displayed on the preview screen, the orientation of an image, the orientation of a print paper, the position of an image, etc., which are displayed on the preview screen. Respective processings shown in the flowcharts of FIGS. 6 to 10 (to be described later on) are executed by the print control app 12. The print setting 12c is various kinds of settings during the printing and includes the size, such as A4, letter, etc., of a print paper (recording paper) used for the printing. The print setting 12c can be changed based on a predetermined operation by the user. When the print control app 12b is activated, the print setting 12c is read out and written to the RAM 13 as a print setting 13a.

The RAM 13 is a rewritable, volatile memory. The RAM 13 stores the print setting 13a. The print setting 13a includes, together with the content of the print setting 12c, an information showing the orientation of print paper (hereinafter referred to as "paper orientation information"), an information showing the rotation angle of print paper (hereinafter referred to as "rotation information"), an information showing the layout of printing (hereinafter referred to as "layout information"), an information identifying each page as an object to be printed (hereinafter referred to as "page information"), an information identifying an image to be arranged in each page as the object (hereinafter referred to as "arrangement information"), and the like. In a case that a print instruction is inputted by a user, the print control app 12b transmits an image data of an image as the object and the content of the print setting 13a to the printer (not shown). Further, an information showing a magnified or reduced state of a print preview image displayed on the print preview screen (hereinafter referred to as "pinch state") is stored in the RAM 13.

The LCD 16 is a liquid crystal display device showing respective screens. The touch panel 17 is provided to be overlaid on the LCD 16, and instruction, etc., is inputted to the tablet terminal 10 by bringing an indicator such as a finger, a bar, etc., into contact with the touch panel 17 or bringing the indicator close to the touch panel 17. The memory card I/F 18 is an interface to which a rewritable, non-volatile memory card MC is installed, and controls data writing or data reading with respect to the memory card 20. The wireless LAN transmitting/receiving section 15 connects the tablet terminal 10 and the various kinds of devices such as a printer, etc. (not shown) by a wireless LAN in conformity to the standard of IEEE 802.11b/g via an access point (not shown) as the relay device, so that the tablet 10 and the various devices can communicate with each other.

The outline of the present teaching will be explained with reference to FIGS. 2 to 5. As described above, the print control app 12b of the embodiment is configured to be capable of changing, on the preview screen, the layout of a print preview image, the orientation of an image, the orientation of a print paper, the position of an image, etc., which are displayed on the preview screen. The preview screen 50 is a screen which is displayed when the user selects an image as the object to be printed and activates the print control app 12b; a print preview image 60 in which an image 62 is arranged in a paper object 61 as a rectangular area corresponding to the print paper is displayed in the preview screen 50. The print preview image 60 is generated such that the number of the generated print preview image 60 corresponds to the number of image 62 selected by the user and the layout set at the time. Note that the term "layout" means arranging "N" piece(s) of image 62 ("N" is an integer not less than 1) with respect to one piece of the paper object 61. As described above, arranging N-piece(s) of the image 62 with respect to one paper object 61 is referred to as "N in 1". In the embodiment, an initially shown layout in the preview screen is a "1 in 1" as shown in FIG. 2.

Figure 2:
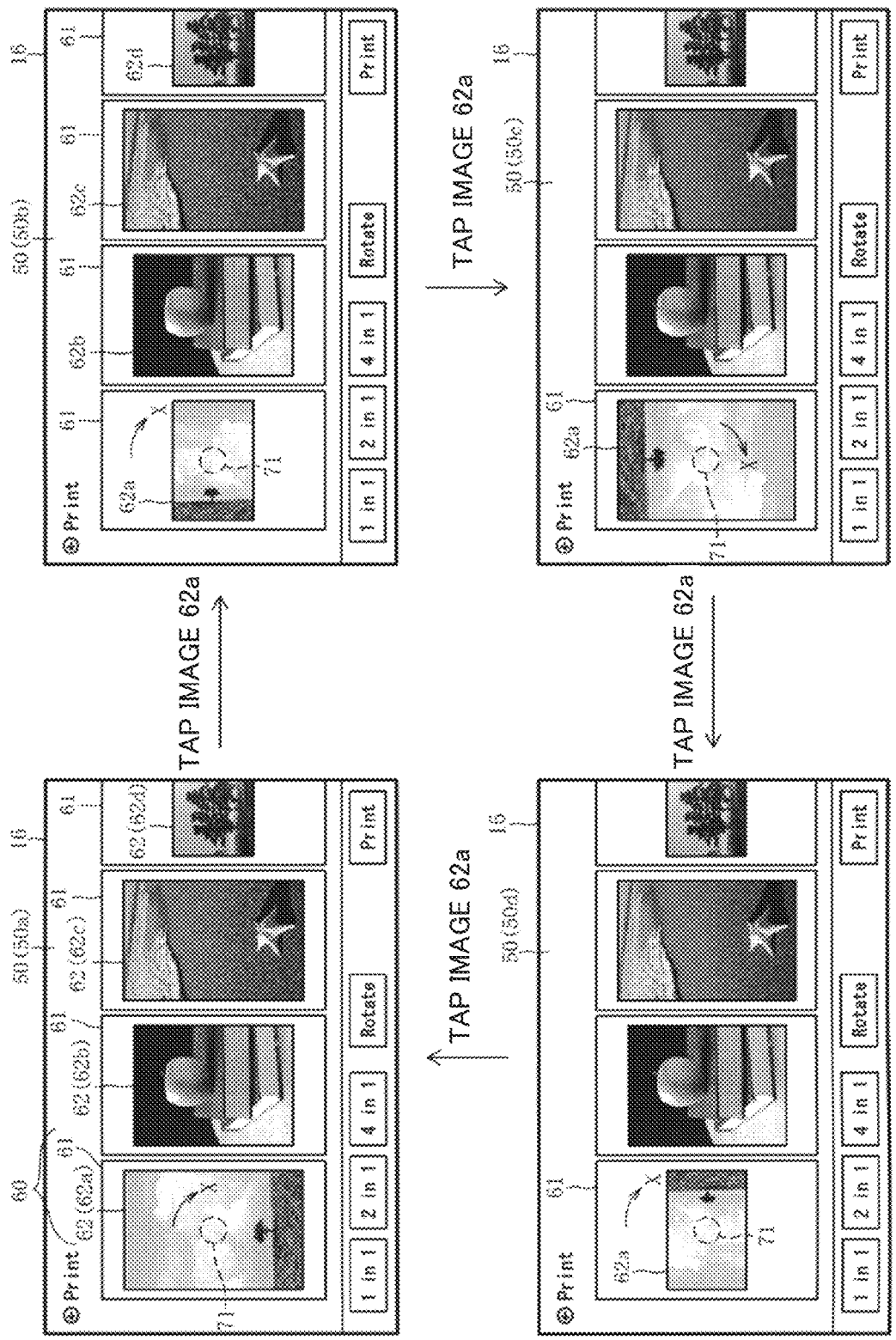
FIG. 2 is a view explaining an operation for changing the orientation of an image.

In a state of the preview image 50 (50a) shown in the upper left section of FIG. 2, when the user taps an arbitrary point 71 in a display area of an image 62a among a plurality of images 62 displayed on the preview screen 50, the tapped image 62a is rotated clockwise (direction of arrow X) by 90 degrees with respect to the paper object 61. Further, the rotated image 62a is reduced so as to be accommodated in a vertically-oriented paper object 61 (paper object 61 in a portrait mode). As a result, the state of the preview screen 50 becomes a state shown in the upper right section of FIG. 2. Note that, as appreciated from the state of the preview screen 50 (50b) shown in the upper right section of FIG. 2, images 62 (62b to 62d) which are different from the tapped image 62a are not rotated, and the orientations of the images 62b to 62d with respect to the respective paper objects 61 are maintained as they are.

Next, in a state of the preview screen 50 (50b) shown in the upper right section of FIG. 2, when the user taps again the arbitrary point 71 inside the display area of the image 62a, the image 62a is rotated further clockwise (direction of arrow X) by 90 degrees with respect to the paper object 61. Then, the rotated image 62a is magnified so as to be accommodated in the vertically-oriented paper object 61. As a result, the state of the preview screen 50 becomes a state shown in the lower right section of FIG. 2. Next, in a state of the preview screen 50 (50c) shown in the lower right section of FIG. 2, when the user gives third tap to the arbitrary point 71 inside the display area of the image 62a, the image 62a is rotated further clockwise (direction of arrow X) by 90 degrees with respect to the paper object 61. In this case also, the rotated image 62a is reduced so as to be accommodated in the vertically-oriented paper object 61. As a result, the state of the preview screen 50 becomes a state shown in the lower left section of FIG. 2. Next, in a state of the preview screen 50 (50d) shown in the lower left section of FIG. 2, when the user gives fourth tap to the arbitrary point 71 inside of the display area of the image 62a, the image 62a is rotated further clockwise (direction of arrow X) by 90 degrees with respect to the paper object 61. In this case also, the rotated image 62a is magnified in such a range that the rotated image 62a is accommodated in the vertically-oriented paper object 61. As a result, the state of the preview screen 50 becomes a state shown in the upper left section of FIG. 2. Namely, every time a point or portion inside the display area of the image 62a is tapped, the image 62a is rotated with respect to the paper object 61 by 90 degrees each, and when the image 62a is tapped four times, the orientation of the image 62a returns to the initial orientation.

In such a manner, according to the print control app 12b of the embodiment, the user taps one image 62 which the user desires to rotate to thereby make it possible to rotate only the one image 62 with respect to the paper object 61 while maintaining the orientation of the remaining images other than the one image 62 as they are. Accordingly, the print control app 12b is excellent in the operability when selectively rotating one image 62 among the plurality of images because selection of the image as the object to be rotated and instruction to rotate the image can be completed with one time of the tapping operation. Further, accompanying with the tapping of the image 62, the print preview image 60 in the preview screen 50 is switched to another print preview image 60 in which the image 62 is rotated. Accordingly, the user can immediately confirm the state that the orientation of the image 62 is rotated. Further, the image 62 rotated with respect to the paper object 61 is magnified or reduced so as to be accommodated in the paper object 61, thereby making it possible to prevent such a state brought about by the rotation of the image 62 that the image 62 cannot be fully accommodated in the print paper (paper object 61). Note that FIG. 2 shows, as an example, a case that one piece of the image 62 is arranged in one paper object 61. However, also in a case of a print preview image 60 in which two or more pieces of the image 62 are arranged in one paper object 61 and when one image 62 among the two or more images 62 is tapped, only the tapped image 62 is rotated and the orientation of the remaining image(s) 62 other than the tapped image 62 is/are maintained as it is or as they are.

As shown in FIG. 3A, the preview screen 50 includes a preview image display area 51 and a button display area 52 formed at a position below the preview image display area 51. The preview image display area 51 is an area in which the print preview image 60 having the image 62 arranged inside the paper object 61 is displayed. The button display area 52 is an area in which various operation buttons are displayed. In the embodiment, as one of the operation buttons displayed in the button display area 52, a Rotate button 81 is prepared. The Rotate button 81 is a button for instructing to rotate the orientation of the print paper by 90 degrees. The user can rotate the orientation of the print paper by operating the Rotate button 81.

Specifically, when the user taps the Rotate button 81 in a state of the preview screen 50 (50a) shown on the left side of FIG. 3A, namely in a state that the paper object 61 is vertically-oriented (in the portrait mode), then all of the paper objects 61 are rotated with respect to the images 62 by 90 degrees, resulting in a state of the preview image 50 (50b) shown on the right side of FIG. 3A. At this time, a vertically-oriented image among the respective images arranged in the paper objects 61, respectively, is reduced so as to be accommodated in the paper object 61 now becoming horizontally-oriented by the rotation of the orientation of the paper object by 90 degrees, as shown on the right side of FIG. 3A. On the other hand, although not shown, a horizontally-oriented image is magnified in a range so that the horizontally-oriented image is accommodated in a paper object 61 now becoming horizontally-oriented due to the 90 degree rotation of the orientation of the paper object 61.

Further, when the user taps the Rotate button 81 in the state of the preview screen 50 (50b) shown on the right side of FIG. 3, namely in a state that the paper objects 61 are horizontally-oriented, then all of the paper objects 61 are rotated with respect to the images 62 by 90 degrees, resulting in a state of the preview image 50 (50a) shown on the left side of FIG. 3. At this time, as shown in FIG. 3, a vertically-oriented image among the respective images arranged in the paper objects 61, respectively, is magnified in a range so that the vertically-oriented image is accommodated in the paper object 61 now becoming vertically-oriented due to the 90 degree rotation of the orientation of the paper object 61. On the other hand, although not shown, a horizontally-oriented image is reduced so as to be accommodated in the paper object 61 now becoming vertically-oriented due to the 90 degree rotation of the orientation of the paper object 61.

In this manner, according to the print control app 12b of the embodiment, the user can rotate the orientation of the print paper on which the image 62 is to be printed from vertical to horizontal, or from horizontal to vertical by tapping the Rotate button 81. Thus, the orientation of the print paper can be easily changed by the tapping operation of the Rotate button 81. Further, accompanying with the tapping of the Rotate button 81, the print preview image 60 in the preview screen 50 is switched to a print preview image 60 in which the orientation of the print paper(s) is/are rotated; and thus the user can immediately confirm the state that the orientation of the print paper has been rotated.

As described above, the print control app 12b has the function of rotating the image 62 in a case that the image 62 is tapped. Accordingly, owing to the allocation of the operation for rotating the orientation of the print paper to the Rotate button 81, the user can easily distinguish the operation for rotating the image 62 from the operation for rotating the orientation of the print paper (paper object 61), which in turn prevents any erroneous operation which might be otherwise caused by any mixing of these operations. Further, the area in which the image 62 (print preview image 60) is displayed (namely, the preview image display area 51) and the area in which the Rotate button 81 is displayed (namely, the button display area 52) are disposed separately from each other. In this regard also, the user can easily distinguish the operation for rotating the image 62 from the operation for rotating the orientation of the print paper. Furthermore, in a case that the orientation of the print paper (paper object 61) is rotated, each of the images 62 is magnified or reduced so as to be accommodated in the rotated paper object 61. Accordingly, it is possible to prevent such a state that each of the images 62 cannot be accommodated in the print paper object 61 which might be otherwise caused by the rotation of the orientation of the print paper.

Note that when the orientations of the print papers (paper objects 61) in which a plurality of images 62 are arranged, respectively, are changed by the tapping operation of the Rotate button 81, the print control app 12b of the embodiment controls the arrangement of each of the images 62 so that the arrangement order of the images 62 inside the paper objects 61 are not changed before and after the rotation.

As an example, FIG. 3B shows a case that regarding a print preview image 60 in which four images 62 (images 62a to 62d) are arranged in one paper object 61, the orientation of the print paper (paper object 61) is rotated. The four images 62 (62a to 62d) are arranged in areas 61a to 61d, respectively, which are four divided portions of the one paper object 61, in a predetermined arrangement order. Specifically, the four images 62a to 62d which are arranged in the vertically-oriented paper object 61 shown on the left side of FIG. 3B are arranged in the paper object 61 such that the first image 62a is arranged in the first area 61a located at the upper left section, the second image 62b is arranged in the second area 61b located at the lower left section, the third image 62c is arranged in the third area 61c located at the upper right section, and the fourth image 62d is arranged in the fourth area 61d located at the lower right section.

In a case of rotating the orientation of the print paper by 90 degrees from the state of the print preview image 60 shown on the left side of FIG. 3B, the positions of the first to fourth areas 61a to 61d are changed to the upper right section, the upper left section, the lower right section and the lower left section, respectively, in the rotated paper object 61, as shown on the right side of FIG. 3B. Accordingly, in such a case that the first to fourth images 62a to 62d are arranged in the respective areas 61a to 61d, respectively, in a similar manner as that before the rotation of the print paper, the arrangement of the four images 62a to 62d are different before and after the rotation. On the other hand, in the print control app 12b, in the case of rotating the orientation of the print paper, the print control app 12b arranges the first image 62a in the second area 61b located at the upper left section, arranges the second image 62b in the fourth area 61d located in the lower left section, arranges the third image 62c in the first area 61a located at the upper right section, and arranges the fourth image 62d in the third area 61c located at the lower right section of the paper object 61 which has been rotated and now oriented horizontally. In such a manner, according to the print control app 12b of the embodiment, it is possible to prevent the arrangement order of the respective images 62 from being changed before and after the rotation of the print paper.

The button display area 52 of the preview screen 50 is provided with a 1-in-1 button 82, a 2-in-1 button 83 and a 4-in-1 button 84 as operation buttons for changing the layout. The 1-in-1 button 82 is a button for instructing a layout for arranging one image 62 inside one paper object 61. The 2-in-1 button 83 is a button for instructing a layout for arranging two images 62 inside one paper object 61. The 4-in-1 button 84 is a button for instructing a layout for arranging four images 62 inside one paper object 61. In a case that the user taps any one of the buttons 82 to 84, a print preview image 60 according to the layout of the tapped button among the buttons 82 to 84 is displayed on the preview image display area 51.

For example, in the state of a preview screen 50 (50a) shown on the left side of FIG. 4A, namely in a state that a print preview image 60 of 1-in-1 in which one image 62 is arranged inside one paper object 61 and when the user taps the 2-in-1 button 83, the preview screen 50 is changed to a state of a preview screen 50 (50b) shown on the right side of FIG. 4A, namely in a state that a print preview image 60 of 2-in-1 in which two images 62 are arranged inside one paper object 61. On the other hand, in the state of the preview screen 50 (50b) shown on the right side of FIG. 4A and when the user taps the 1-in-1 button 82, the preview screen 50 is changed to the state of the preview screen 50 (50a) shown on the left side of FIG. 4A.

In such a manner, according to the print control app 12b of the embodiment, the user can change the layout of the print preview image 60 by operating the buttons 82 to 84 for changing the layout. Accordingly, the layout can be changed by an easy operation, without performing any complex operations, such as those associated with the conventional technique, of calling up (activating) a screen for changing the layout and designating or specifying the layout on the called-up screen, etc. Further, accompanying with the operation of the buttons 82 to 84, the print preview image 60 is switched to a print preview image 60 of the changed layout, and thus the user can immediately confirm the print preview image 60 by the changed layout.

FIG. 4B is a view explaining an operation of magnifying or reducing the print preview image 60 on the preview screen 50. In the embodiment, the user can magnify or reduce the print preview image 60 by performing a pinch-out operation or pinch-in operation with respect to the preview screen 50. Note that the term "pinch-in operation" is an operation of causing indicators such as fingers to move closely to or contact with respect to two points on the touch panel 17 and to cause the two points to approach closely to each other. On the other hand, the term "pinch-out operation" is an operation of causing indicators such as fingers to move closely to or contact with two points on the touch panel 17 and to cause the two points to move away from each other.

Specifically, in a state of the preview image 50 (50a) shown on the left side of FIG. 4B and when the user performs the pinch-in operation for this preview image 50, each of the preview images 60 displayed in the preview image display area 51 is reduced. In the embodiment, accompanying with the reduction of the print preview images 60, the number of displayed row (number of displayed column) which is displayed in the preview image display area 51 is changed to 2 rows (2 columns). As a result, a preview screen 50 with the state shown on the right side of FIG. 4B is displayed. On the other hand, in a state of the preview image 50 (50a) shown on the right side of FIG. 4B, namely in the state that the print preview images 60 are reduced and when the user performs the pinch-out operation for this preview image 50, each of the preview images 60 displayed in the preview image display area 51 is magnified. As a result, the preview screen 50 (50a) with the state shown on the left side of FIG. 4B is displayed. Namely, accompanying with the magnification of the print preview images 60, the preview screen 50a in which the number of displayed row is changed from 2 rows to 1 row is displayed.

As described above, according to the print control app 12b of the embodiment, the user can magnify or reduce the print preview images 60 easily and intuitively by performing the pinch-out operation or the pinch-in operation. In a case that the layout is changed accompanied by the operation of the buttons 82 to 84, the number of the images 62 arranged in one paper object 61 is increased, which in turn results in the size of the images 62 becomes small by the extent corresponding to the increased number of the arranged images 62. Accordingly, in such a case, the following situation is conceived that the magnification of the print preview image 60 is desirable so as to enable the user to confirm each of the images 62. On the other hand, the following situation is also conceived that the reduction of the print preview image 60 is desirable so as to enable the user to confirm the layout as a whole.

According to the print control app 12b of the embodiment, the user can magnify or reduce the print preview images 60, in a state that the print preview images 60 are displayed on the preview screen 50, by performing the pinch-out operation or the pinch-in operation with respect to the preview screen 50. Therefore, it is possible to appropriately perform the confirmation of the respective images 62 and the confirmation of the entire layout. Since the buttons 82 to 84 for changing the layout are provided on the preview screen 50, it is possible to magnify or reduce the print preview images 60 as necessary while changing the layout by the operation of the buttons 82 to 84, which in turn provides an excellent operability when changing the layout.

Further, in a case of reducing the print preview images 60, the number of displayed row (number of displayed column) of the print preview images 60 displayed in the preview image display area 51 is made to be 2 rows (2 columns), whereas in a case of magnifying the print preview images 60, the number of displayed row of the print preview images 60 is made to be 1 row, thereby making it possible to make the number of the print preview images 60 which is confirmable by the user at one time to be a number that is as large as possible in accordance with the size (dimension) of the print preview images 60. Accordingly, the user can easily confirm the print preview images 60. According to the print control app 12b of the embodiment, as shown in FIG. 4B, each of the print preview images 60 displayed in the preview image display area 51 is allowed to have such a size that prevents the print preview image 60 from extending out of the preview image display area 51 with respect to the up/down direction, regardless of the number of the displayed row being 1 row or 2 rows. Accordingly, even when any one of the magnification and the reduction of the displayed print preview images 60 by the pinch-out operation or the pinch-in operation is performed, the print preview image 60 does not extend out of the preview image display area 51 at least with respect to the up/down direction. Therefore, the user can easily confirm the print preview images 60. Note that according to the print control app 12b of the embodiment, in a case that the user performs a scroll operation with respect to the left/right direction (direction L/R indicated by a double-sided arrow in FIG. 4B) by using an indicator such as a finger, etc., the print preview images 60 displayed in the preview screen display area 51 can be scrolled in the left/right direction. Therefore, even in a case that all of the print preview images 60 cannot be displayed in the preview image display area 51, the user can confirm all the print preview images 60 by performing the scroll operation in the left/right direction.

In the embodiment, the user can exchange the positions of two images 62 by performing a drag-and-drop operation. Specifically, in a state of the preview screen 50 (50a) shown on the left side of FIG. 5, when the user touches an arbitrary point 71 inside the display area of one image 62a, among a plurality of images 62 displayed on the preview screen 50, with an indicator such as a finger and then drags the indicator along a route Pa passing the outside of the paper object 61 and drops (releases) the indicator at an arbitrary point 72 inside the display area of an image 62b as an exchange target (position-exchange target), the positions of the image 62a and the image 62b are exchanged. As a result, the state of a preview screen 50 (50b) shown on the right side of FIG. 5 is provided.

Figure 5:
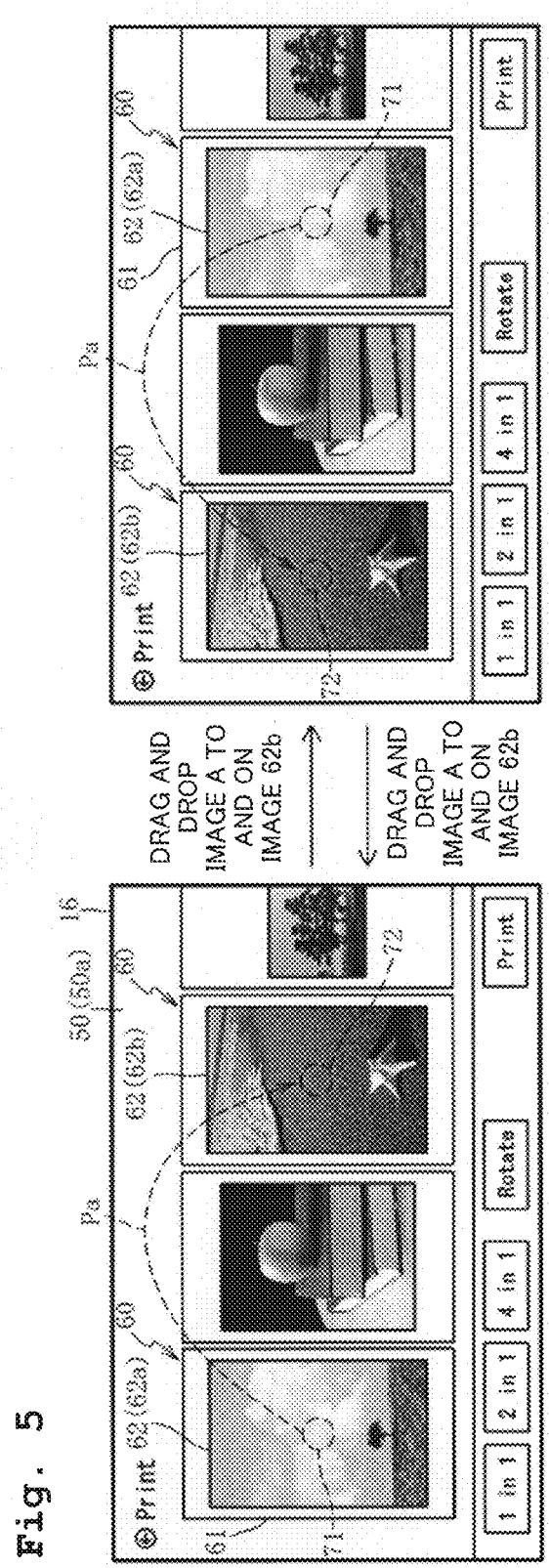
FIG. 5 is a view explaining an operation for exchanging the positions of two images.

Note that also in a case that, in the state of the preview screen 50 (50a) shown on the left side of FIG. 5 and the user touches the arbitrary point 72 inside the display area of the image 62b with the indicator and then drags the indicator along a route opposite to the route Pa and passing the outside of the paper object 61 and drops the indicator at the arbitrary point 71 inside the display area of the image 62a, the state the preview screen 50 (50b) shown on the right side of FIG. 5 is provided.

On the other hand, in the state of the preview screen 50 (50b) shown on the right side of FIG. 5 and the user touches the arbitrary point 71 inside the display area of the image 62a with the indicator and then drags the indicator along the route passing the outside of the paper object 61 and drops the indicator at the arbitrary point 72 inside the display area of the image 62b, the positions of the image 62a and the image 62b are exchanged and the state of the preview screen 50 (50a) shown on the left side of FIG. 5 is provided as a result.

In such a manner, according to the print control app 12b of the embodiment, the user can exchange the positions of two images 62a and 62b as exchange objects easily and intuitively by performing the drag-and-drop operation between the two images 62a and 62b. Note that FIG. 5 shows a case that the print preview image 60 in which one image 62 is arranged in one paper object 61 is displayed on the preview screen 50, it is possible to exchange the positions of arbitrary two images 62 even in a case of a print preview image 60 in which not less than two pieces of the images 62 are arranged in one paper object 61.

Although not shown in the drawings, according to the print control app 12b of the embodiment, the positions of two print preview images 60 can be exchanged by a drag-and-drop operation similar to that for exchanging the positions of the images. It is possible to exchange the positions of two print preview images 60 by touching, with the indicator, a margin area, namely an area in which no image 62 is arranged, of one print object 61 associated with one print preview image 60 of the two print preview images 60 and then by dragging the indicator along a route passing the outside of the paper object 61 associated with the one print preview image 60 and dropping (releasing) the indicator at a margin area of another print object 61 associated with the other print preview image 60 of the two print preview images 60. Accordingly, it is possible to exchange the positions of two print objects 61 easily and intuitively by performing the drag-and-drop operation between the two print objects 61 as the exchange targets.

Figure 6A:
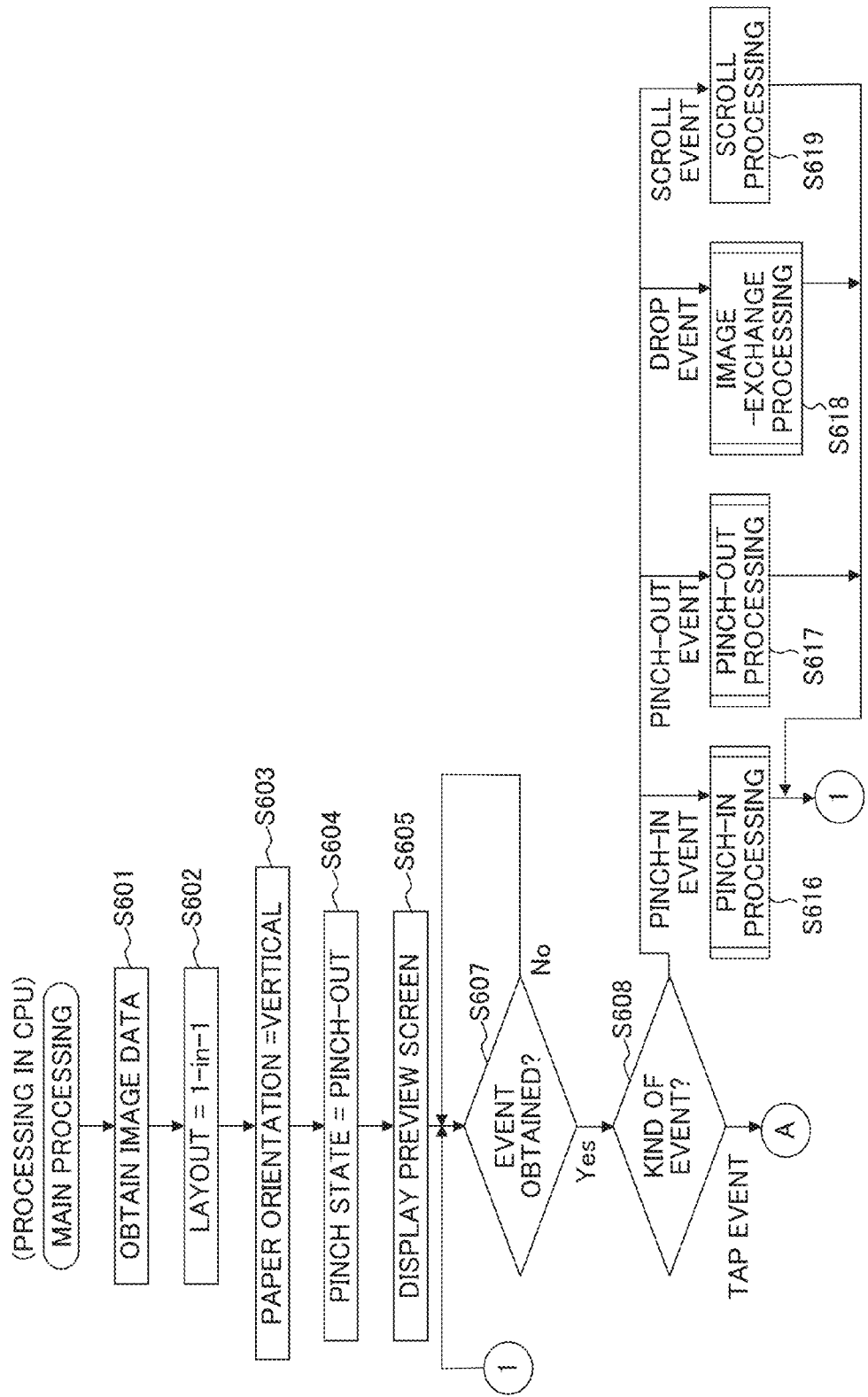
FIGS. 6A and 6B are flowcharts showing a processing of selecting optimum layout.
Figure 6B:
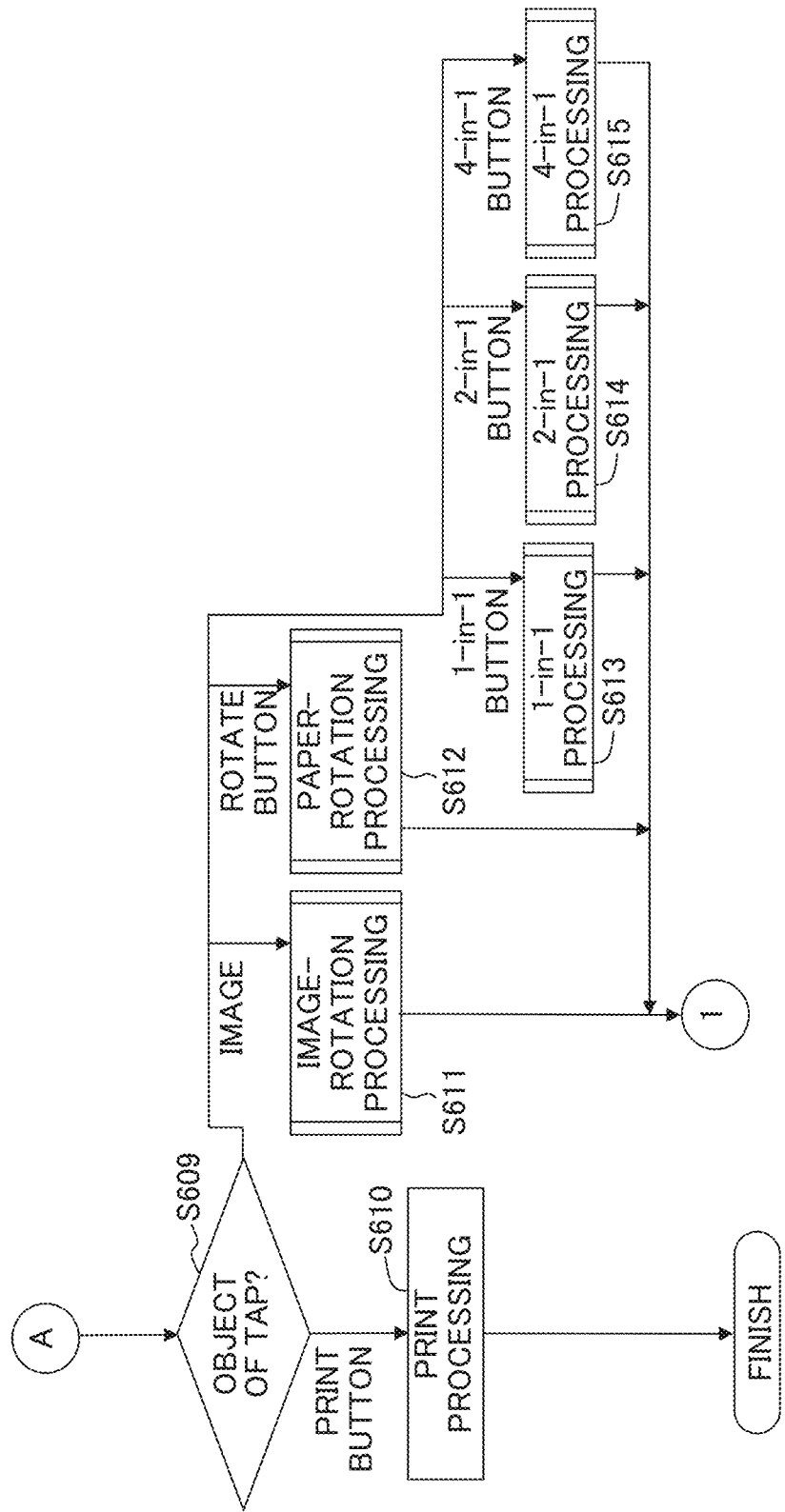

The processing shown in FIGS. 6A and 6B is started when the user finalizes the selection of an image as the object to be printed. Accompanying with the start of this processing, the CPU 11 stores the print setting 12c in the RAM 13 as the print setting 13a. In the processing, at first in step S601 (hereinafter omitting the wording "step" in the respective steps described below as appropriate), the CPU 11 obtains an image data corresponding to the image selected by the user. Next, the CPU 11 stores a value "1-in-1" indicating that the layout is 1-in-1 layout in the print setting 13a, as the layout information in the RAM 13 (S602); and the CPU 11 stores a value "vertically-oriented" indicating that the print paper is vertically oriented in the print setting 13a, as the paper orientation information, in the RAM 13 (S603). Further, the CPU 11 stores a value "pinch-out" indicating that the print preview image 60 is in a magnified state, as the pinch state, in the RAM 13 (S604).

Next, the CPU 11 causes the preview screen 50 to be displayed on the LCD 16 (S605). By the storage of the respective informations in the RAM 13 in Steps S602 to S604, each of the print preview images displayed on the preview screen 50 is an image in which the image is arranged in a vertically-oriented paper object with the 1-in-1 layout; and the print preview images are displayed in one row in the preview image display area 51 of the preview screen 50. The initial display in the preview screen 50 by Step S605 is, for example, the preview screen 50 shown on the left side of FIG. 4B. Note that in Step S605, the CPU 11 stores page information identifying the page number of each of the print preview images 60 and arrangement information identifying image(s) arranged in each of the print preview images 60, as the print setting 13a regarding all the print preview images 60 displayed on the preview screen 50, in the RAM 13.

Next, the CPU 11 judges whether or not an event is obtained (S607). In a case that any event is not obtained (S607: NO), the CPU 11 repeats the judgment of Step S607 until an event is obtained. On the other hand, in a case that the CPU 11 obtains an event (S607: YES), the CPU 11 judges (determines) the kind of the obtained event (S608). In a case that the CPU 11 judges in Step S608 that the kind of the obtained event is a tap event (S608: Tap event) and when the tapped object is the print button displayed in the button display area 51 of the preview screen 50 (S609: Print button), the CPU 11 executes a print processing of transmitting an image data corresponding to the selected image and the print setting 13a to a printer (not shown in the drawing), and completes the processing.

In a case that the tapped object is an image inside the print preview image 60 displayed in a preview image display area 51 (S609: Image), the CPU 11 executes the image-rotation processing in FIG. 7A (S611), and returns the procedure to Step S607. On the other hand, in a case that the tapped object is the Rotate button 81 (S609: Rotate button), the CPU 11 executes the paper rotation processing in FIG. 7B (S612), and returns the procedure to Step S607. Further, in a case that the tapped object is the 1-in-1 button 82 (S609: 1-in-1 button), the CPU 11 executes the 1-in-1 processing in FIG. 8A (S613), and returns the procedure to Step S607. Further, in a case that the tapped object is the 2-in-1 button 83 (S609: 2-in-1 button), the CPU 11 executes the 2-in-1 processing in FIG. 8B (S614), and returns the procedure to Step S607. Furthermore, in a case that the tapped object is the 4-in-1 button 84 (S609: 4-in-1 button), the CPU 11 executes the 4-in-1 processing in FIG. 9A (S615), and returns the procedure to Step S607.

Figure 10A:
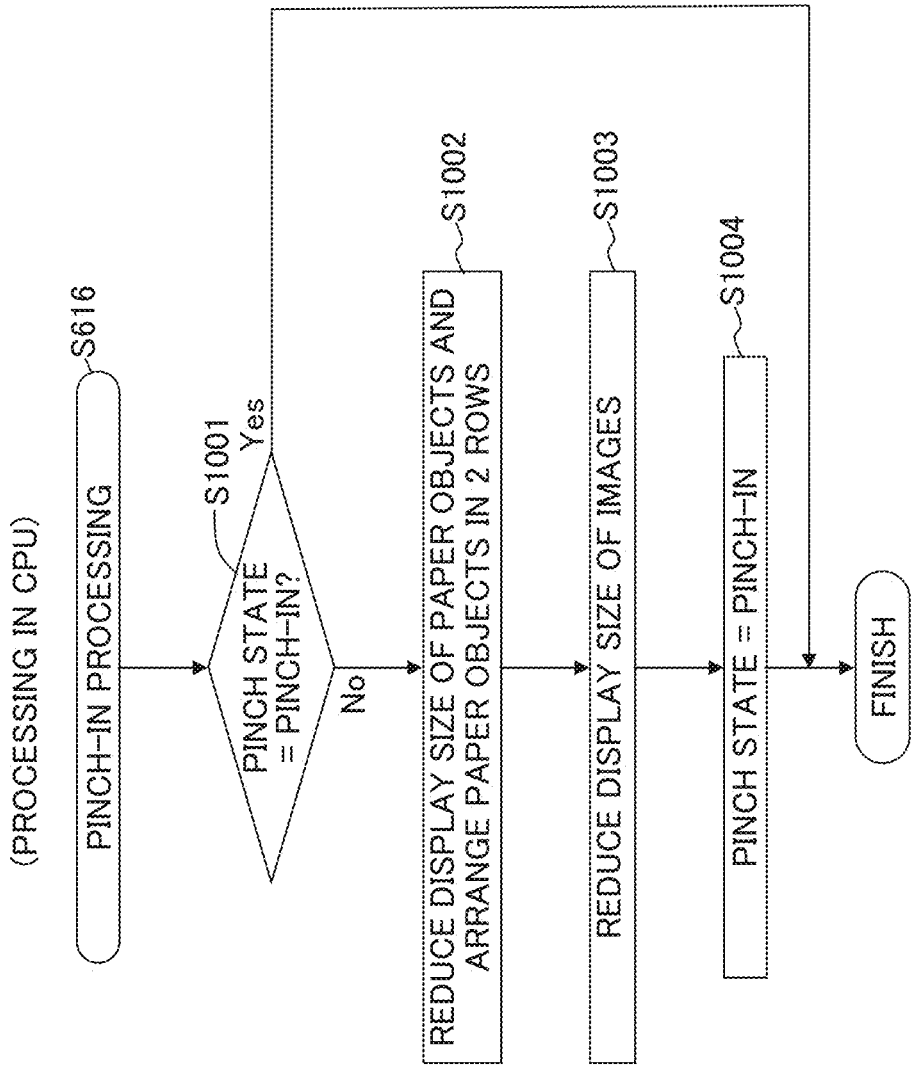

On the other hand, in a case that the CPU 11 judges in Step S608 that the kind of the obtained event is a pinch-in event (S609 Pinch-in event), the CPU 11 executes a pinch-in processing in FIG. 10A (S616), and returns the procedure to Step S607. In a case that the CPU 11 judges in Step S608 that the kind of the obtained event is a pinch-out event (S608: Pinch-out event), the CPU 11 executes a pinch-out processing in FIG. 10B (S617), and returns the procedure to Step S607. In a case that the CPU 11 judges in Step S608 that the kind of the obtained event is a drop event (S608: Drop event), the CPU 11 executes an image-exchange processing in FIG. 10C (S618), and returns the procedure to Step S607. Note that in the embodiment, regarding the drag-and-drop operation for exchanging the position of two images, the detection of the drag operation from touching one image with an indicator until dropping the one image at the display area of another image is executed by the OS 12a. In a case that the CPU 11 judges that the kind of the obtained event in S608 is a scroll event (S608: Scroll event), the CPU 11 executes the scroll processing of scrolling the respective print preview images 60 displayed on the preview screen 50 (S619) in accordance with the scroll event, and returns the procedure to Step S607.

Figure 7A:
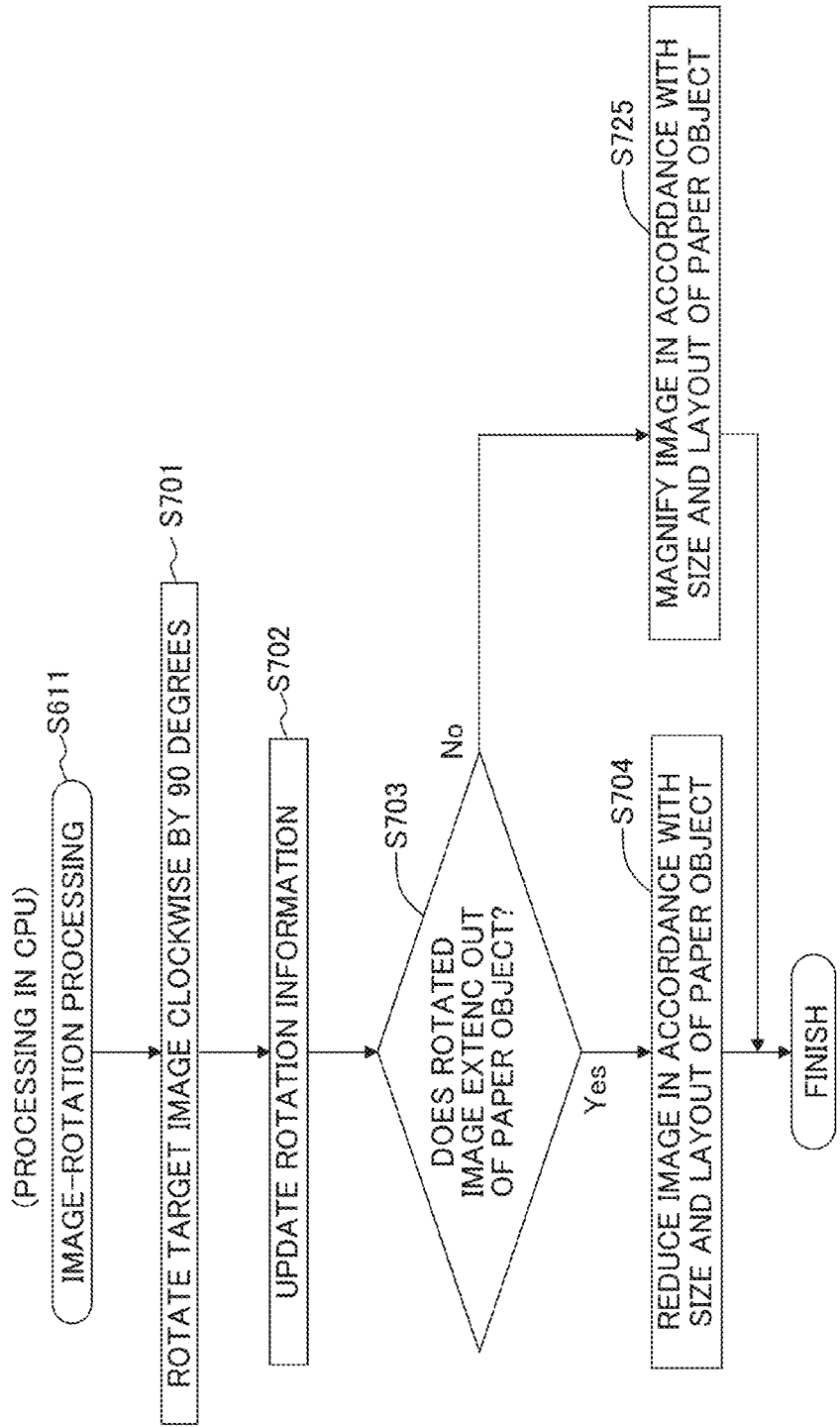

The processing shown in FIG. 7A is a processing of generating a print preview image 60 in which the tapped image 62 is rotated with respect to the paper object 61, and for displaying the generated print preview image 60 on the preview screen 50. At first, the CPU 11 rotates the image 62 as the tapped object by 90 degrees clockwise (S701), and updates the rotation information, as one of the print setting 13a, showing by which degrees (extent) the target image is rotated from the original orientation thereof (S702). The rotation information has a value from not less than 0 degree to less than 360 degrees, and is set with respect to each of the selected images 62. Accompanying with the start of the main processing, the CPU 11 stores, in the RAM 13, 0 degree with respect to all of the selected images 62, as the initial value of the rotation information. In Step S702, the rotation information corresponding to the rotated image 62 is updated by adding thereto the angle by which the image 62 is rotated (90 degrees in the embodiment). Note that when the value of the rotation information reaches 360 degrees by the addition, the value is returned to 0 degree. Accordingly, in a case that the user taps the image 62 to thereby rotate the image 62, the rotation information is updated in S702. Accordingly, at the time of printing, it is possible to perform printing in which the rotation of the image 62 based on the tapping operation by the user is reflected.

Next, in a case that the rotated image 62 extends out of the paper object 61, more specifically, extends out of the print area excluding margin in the paper object 61 (S703: YES), the CPU 11 reduces the rotated image 62 in accordance with the size of the paper object 61 and the layout (N-in-1) so that the rotated image 62 is accommodated within the print area (S704), and completes the processing. Accordingly, for example, the image 62a displayed on the preview screen 50a on the upper left side in FIG. 2 is displayed, as the result of performing the processing in Step S701 and the processing in Step S704, as an image which is rotated clockwise by 90 degrees and reduced so as to be accommodated in the print area of the paper object 61, like the image 62a as displayed on the preview screen 50b on the upper right side in FIG. 2.

On the other hand, in a case that the rotated image 62 does not extend out of the print area of the paper object 61 (S703: NO), the CPU 11 magnifies the rotated image 62 in accordance with the size of the paper object 61 and the layout in such a range that the image 62 is accommodated in the print area (S705), and completes the processing. Accordingly, for example, the image 62a displayed on the preview screen 50b on the upper right side in FIG. 2 is displayed, as the result of performing the processing in Step S701 and the processing in Step S705, as an image which is rotated clockwise by 90 degrees and magnified in such a range so that the image 62a is accommodated in the print area of the paper object 61, like the image 62a as displayed on the preview screen 50c on the lower right side in FIG. 2.

Figure 7B:
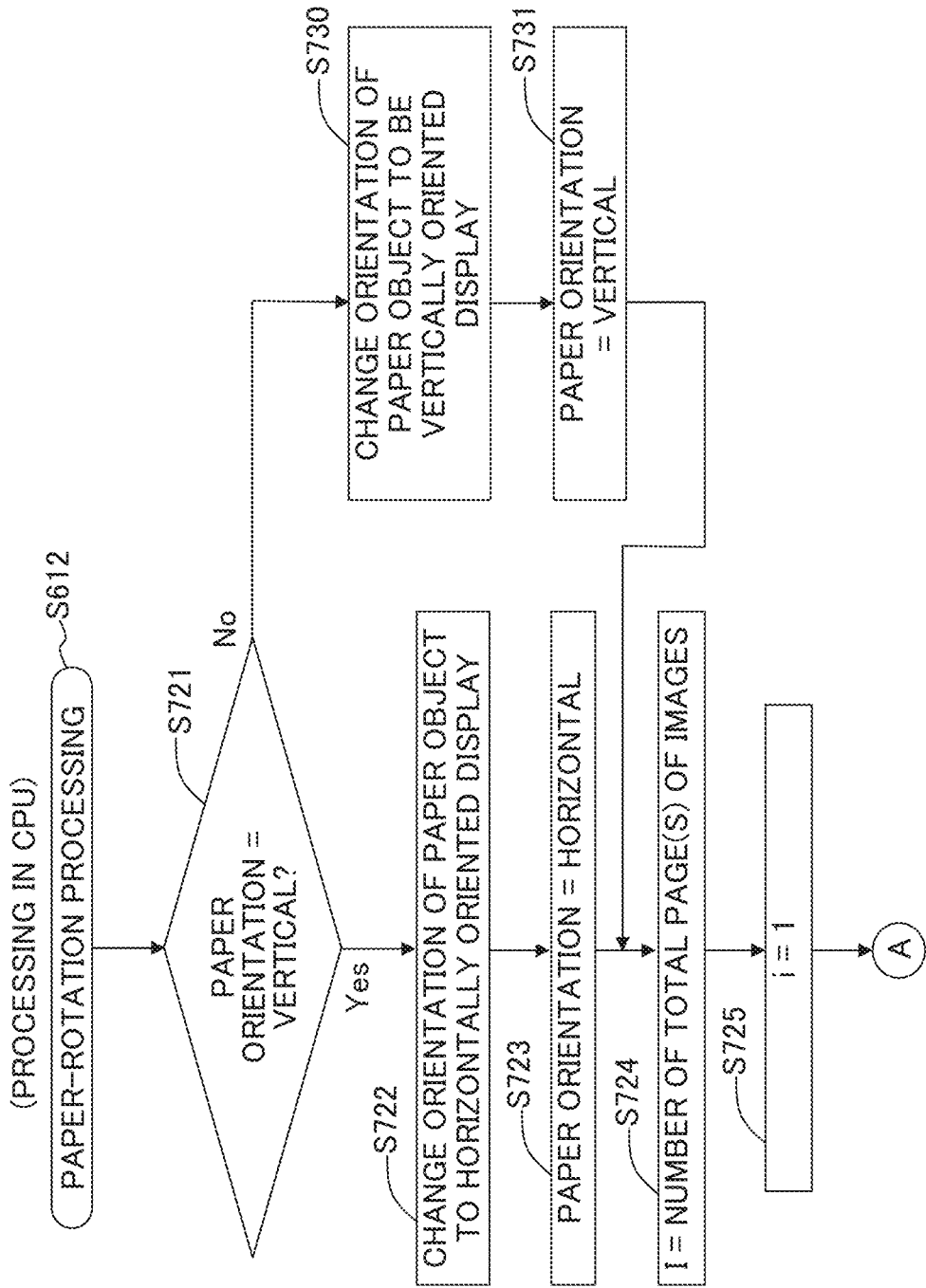

The processing shown in FIG. 7B is a processing of generating a print preview image 60 in which the print paper (print object 61) is rotated with respect to the image 62 and for displaying the generated print preview image 60 on the preview screen 50. At first, in a case that the paper orientation information which is stored as one of the print setting 13a indicates a value "vertically oriented" indicating that the orientation of the print paper is vertical (S721: YES), the CPU 11 changes the orientation of the paper object to horizontally oriented display (S722), and updates the paper orientation information in the print setting 13a to a value "horizontally oriented" indicating that the orientation of the print paper is horizontal (S723). On the other hand, in a case that in Step S721 the paper orientation information indicates "horizontally-oriented" (S721: NO), the CPU 11 changes the orientation of the paper object to vertical (S730), and updates the paper orientation information in the print setting 13a to "vertically-oriented" (S731). Note that when changing the orientation of the paper object 61 in Step S722 or Step S730, the CPU 11 re-arranges, as necessary, the images 62 so that the arrangement order of the images 62 in the respective paper objects 61 are not changed before and after the change of orientation. In a case that the user taps the Rotate button 81 to change the orientation of the print paper, the paper orientation information is updated in Step S723 or Step S731; and thus, at the time of printing, it is possible to perform the printing in which the orientation of the print paper is reflected based on the operation by the user.

After performing the processing in Step S723 or Step S731, the number of total page(s) of the selected images 62 is set in a variable "I" (S724), and sets "1" in a variable "i" (S725). Next, the CPU 11 selected an i-th image 62, and judges whether or not the i-th image 62 extends out of the print area of the rotated paper object 61 (S726). In a case that the CPU 11 judges in Step S726 that the i-th image 62 extends out of the recording area of the rotated paper object 61 (S726: YES), the CPU 11 reduces the i-th image 62 depending on the size and layout of the rotated paper object 61 so that the i-th image 62 is accommodated inside the printing area (S727). Accordingly, for example, after the image 62 displayed on the preview screen 50a on the left side in FIG. 3A is subjected to the processing in Step S722 and the processing in Step S727, the image 62a is displayed as an image rotated clockwise by 90 degrees and reduced so as to be accommodated in the print area of the paper object 61, like the image 62a displayed on the preview screen 50 on the right side of FIG. 3A.

On the other hand, in a case that the CPU 11 judges in Step S726 that the i-th image 62 does not extend out of the print area of the rotated paper object 61 (S726: NO), the CPU 11 magnifies the i-th image 62 in such a range that the i-th image 62 is accommodated in the print area, depending on the size and layout of the rotated paper object 61 (S732). Accordingly, for example, after the image 62a displayed on the preview screen 50b on the right side in FIG. 3A is subjected to the processing in Step S722 and the processing in Step S732, the image 62a is displayed as an image rotated clockwise by 90 degrees and magnified in such a range that the i-th image 62 is accommodated in the print area of the paper object 61, like the image 62 displayed on the preview screen 50 on the left side of FIG. 3A. After executing the processing in Step S727 or Step S732, the CPU 11 adds 1 to the variable i (S728). Next, in a case that the value of the variable i≤the value of the variable I (the number of total page(s) of the selected images 62) (S729: NO), the CPU 11 returns the procedure to Step S726. On the other hand, in a case that the value of the variable i>the value of the variable I (S729: YES), the CPU 11 completes the processing.

Figure 8A:
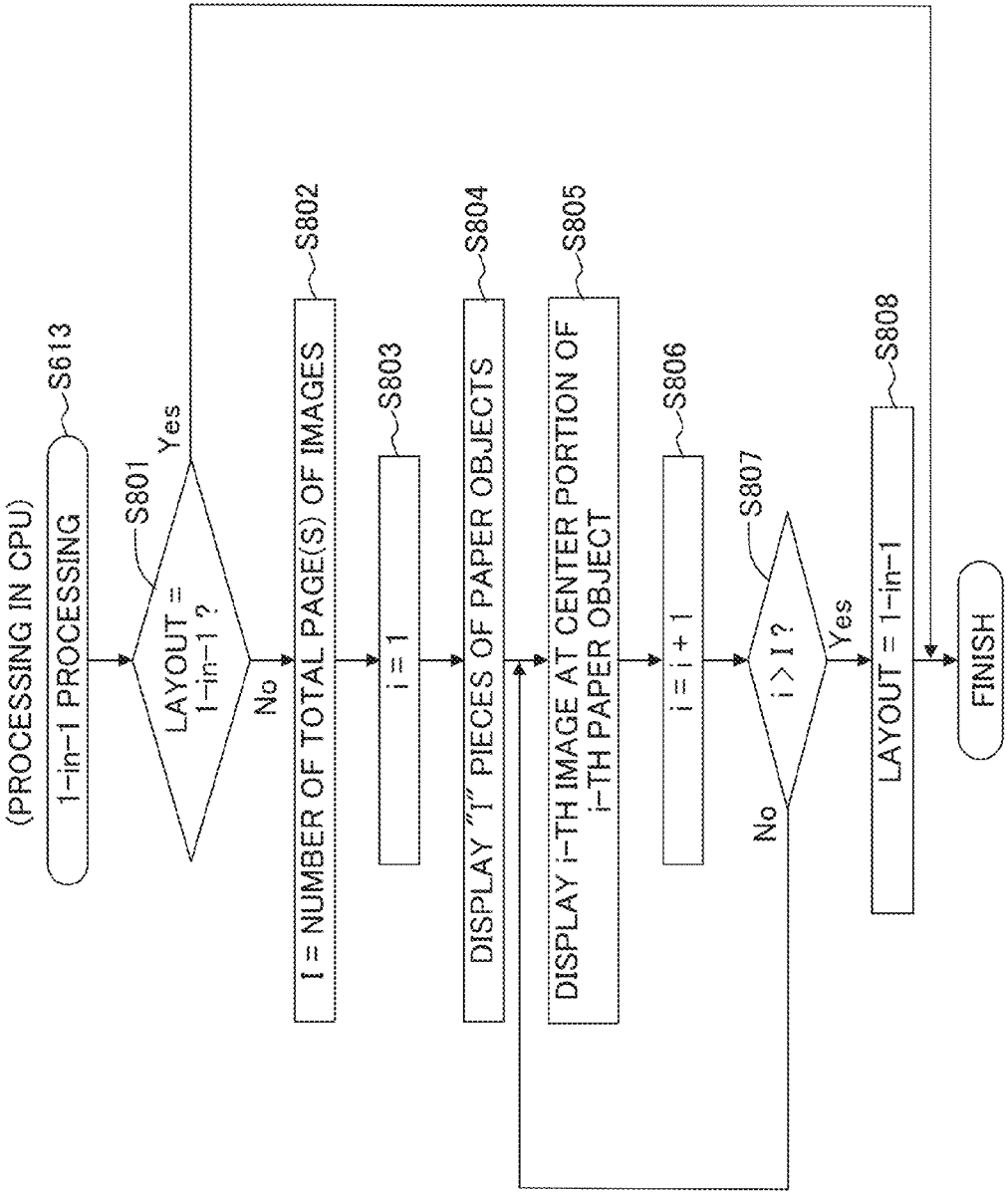
Figure 8C:
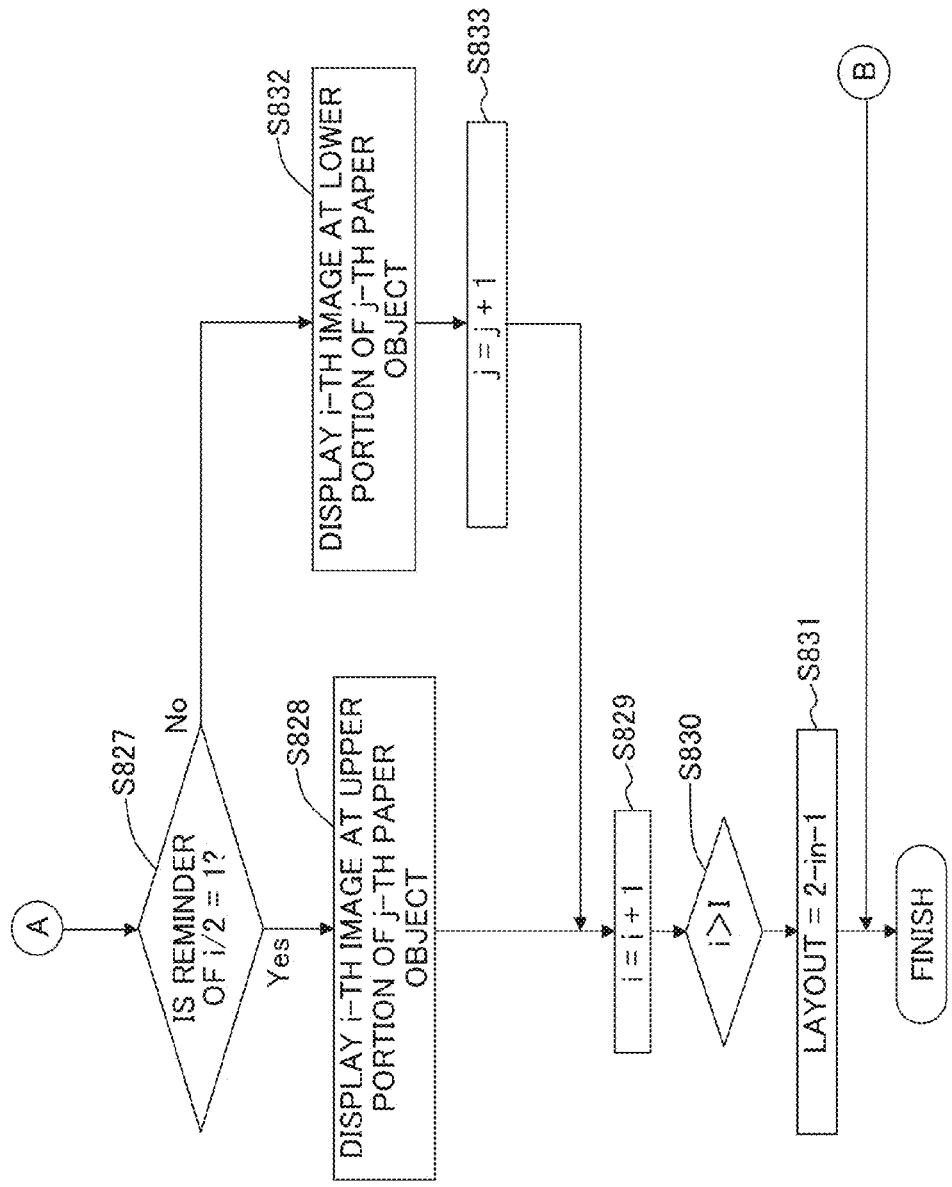

The processing shown in FIG. 8A is a processing of generating a print preview image 60 of the 1-in-1 layout, and allowing the generated print preview image 60 to be displayed on the preview screen 50. At first, in a case that the layout information stored as one of the print setting 13a is a value "1-in-1" indicating that the layout is 1-in-1 (S801: YES), the layout is already 1-in-1, and thus the CPU 11 completes the processing. On the other hand, in a case that in Step S801 the layout information is not "1-in-1" (S801: NO), the CPU 11 sets the number of total page(s) of the selected images 62 in the variable I (S802), and sets "1" in the variable i (S803). Next, the CPU 11 displays I-pieces of the print objects 60 on the preview screen 50 (S804), and displays the i-th image 62 at the center portion of the i-th paper object 61 (S805). Note that in Step S805, the CPU 11 updates the page information and the arrangement information which are stored as the print setting 13a. Next, the CPU 11 adds 1 to the variable i (S806). Next, in a case that the value of the variable i≤the value of the variable I (the number of total page(s) of the selected images 62) (S807: NO), the CPU 11 returns the procedure to Step S805. On the other hand, in a case that the value of the variable i>the value of the variable I (S807: YES), the CPU 11 updates the layout information in the print setting 13a as "1-in-1" (S808), and completes the processing. Accordingly, in a case that the user taps the 1-in-1 button 82 and changes the layout to the 1-in-1 layout, the layout information is updated in Step S808. Therefore, at the time of printing, it is possible to execute the printing with the layout set based on the user's operation.

The processing shown in FIG. 8B is a processing of generating a print preview image 60 of the 2-in-1 layout, and allowing the generated print preview image 60 to be displayed on the preview screen 50. At first, in a case that the layout information stored as one of the print setting 13a is a value "2-in-1" indicating that the layout is 2-in-1 (S821: YES), the layout is already 2-in-1, and thus the CPU 11 completes the processing. On the other hand, in a case that in Step S821 the layout information is not "2-in-1" (S821: NO), the CPU 11 sets the number of total page(s) of the selected images 62 in the variable I (S822), and sets "1" in the variable i (S823). Next, the CPU 11 divides the value of the variable I (the number of total page(s) of the selected images 62) by 2, and calculates the value with the decimals rounded up to the nearest integer as a variable J (S824). The value of the variable J calculated in Step S824 is the number of page(s) of the print preview images 60 with the 2-in-1 layout. Next, the CPU 11 sets "1" in a variable j (S825), and displays J-pieces of the print objects 60 on the preview screen 50 (S826).

Next, in a case that the remainder of the value of the variable i divided by 2 is 1 (S827: YES), the CPU 11 displays the i-th image 62 at an upper portion of the j-th paper object 61 (S828). On the other hand, in a case that the remainder of the value of the variable i divided by 2 is 0 (S827: NO), the CPU 11 displays the i-th image 62 at a lower portion of the j-th paper object 61 (S832). Note that in Step S832, the CPU 11 updates the page information and the arrangement information which are stored as the print setting 13a. Next, the CPU 11 adds 1 to the variable j (S833). After executing the processing in Step S828 or Step S833, the CPU 11 adds 1 to the variable i (S829). Next, in a case that the value of the variable i≤the value of the variable I (the number of total page(s) of the selected images 62) (S830: NO), the CPU 11 returns the procedure to Step S827. On the other hand, in a case that the value of the variable i>the value of the variable I (S830: YES), the CPU 11 updates the layout information in the print setting 13a as "2-in-1" (S831), and completes the processing. Accordingly, in a case that the user taps the 2-in-1 button 83 and changes the layout to the 2-in-1 layout, the layout information is updated in Step S831. Therefore, at the time of printing, it is possible to execute the printing with the layout set based on the user's operation.

Figure 9A:
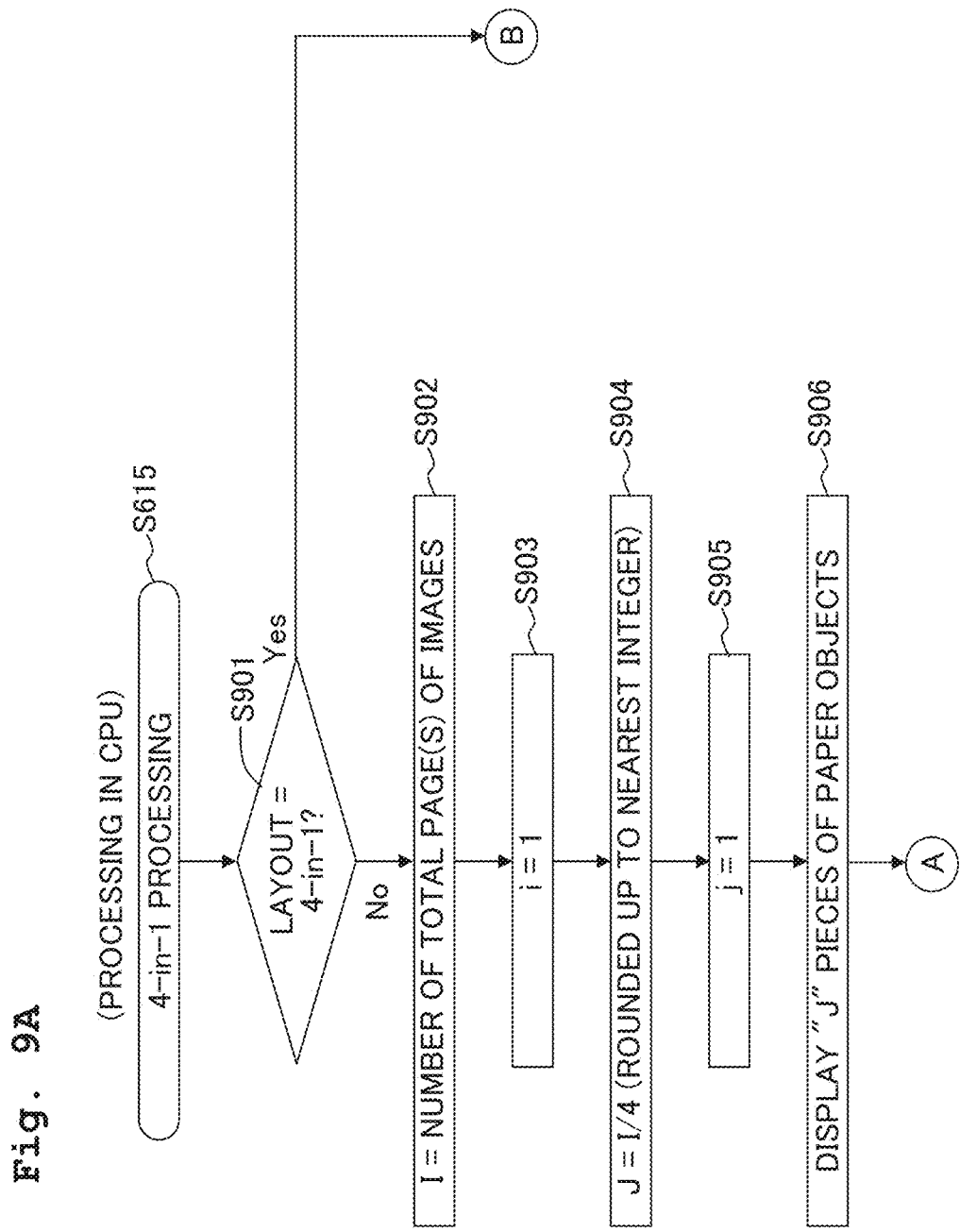

The processing shown in FIGS. 9A and 9B is a processing of generating a print preview image 60 of the 4-in-1 layout, and allowing the generated print preview image 60 to be displayed on the preview screen 50. At first, in a case that the layout information stored as one of the print setting 13a is a value "4-in-1" indicating that the layout is 4-in-1 (S901: YES), the layout is already 4-in-1, and thus the CPU 11 completes the processing. On the other hand, in a case that in Step S901 the layout information is not "4-in-1" (S901: NO), the CPU 11 sets the number of total page(s) of the selected images 62 in the variable I (S902), and sets "1" in the variable i (S903). Next, the CPU 11 divides the value of the variable I (the number of total page(s) of the selected images 62) by 4, and calculates the value with the decimals rounded up to the nearest integer as a variable J (S904). The value of the variable J calculated in Step S904 is the number of page(s) of the print preview image 60 with the 4-in-1 layout. Next, the CPU 11 sets "1" in a variable j (S905), and displays J-pieces of the print objects 60 on the preview screen 50 (S906).

Next, in a case that the remainder of the value of the variable i divided by 4 is 1 (S907: 1), the CPU 11 displays the i-th image 62 at an upper left section of the j-th paper object 61 (S908). On the other hand, in a case that the remainder of the value of the variable i divided by 4 in Step S907 is 2 (S907: 2), the CPU 11 displays the i-th image 62 at a lower left section of the j-th paper object 61 (S912). Alternately, in a case that the remainder of the value of the variable i divided by 4 in Step S907 is 3 (S907: 3), the CPU 11 displays the i-th image 62 at an upper right section of the j-th paper object 61 (S913). Alternatively, in a case that the remainder of the value of the variable i divided by 4 is 0 (S907: 0), the CPU 11 displays the i-th image 62 at an lower right section of the j-th paper object 61 (S914). Note that in Step S914, the CPU 11 updates the page information and the arrangement information which are stored as the print setting 13*a*. Next, the CPU 11 adds 1 to the variable j (S915). After executing the processing in Step S908, S912, S913 or S914, the CPU 11 adds 1 to the variable i (S909). Next, in a case that the value of the variable i≤the value of the variable I (the number of total page(s) of the selected images 62) (S910: NO), the CPU 11 returns the procedure to Step S907. On the other hand, in a case that the value of the variable i>the value of the variable I (S910: YES), the CPU 11 updates the layout information in the print setting 13*a* as "4-in-1" (S911), and completes the processing. Accordingly, in a case that the user taps the 4-in-1 button 84 and changes the layout to the 4-in-1 layout, the layout information is updated in Step S911. Therefore, at the time of printing, it is possible to execute the printing with the layout set based on the user's operation.

The processing shown in FIG. 10A is a processing of allowing reduced print preview images 60 to be displayed on the preview screen 50 in two rows. At first, in a case that the pinch state stored in the RAM 13 is a value "pinch-in" indicating that the print preview images 60 are in a reduced state (S1001: YES), the print preview images 60 are already in the reduced state, and thus the CPU 11 completes the processing. On the other hand, in a case that the pinch state stored in the RAM 13 is a value "pinch-out" indicating that the print preview images 60 are in a magnified state (S1001: NO), the CPU 11 reduces the display size of each of the paper objects 61 and displays the paper objects 61 in 2 rows (S1002), and the CPU 11 reduces the display sizes of the images 62 in accordance with the reduced display sizes of the paper objects 61 (S1003). Next, the CPU 11 stores "pinch-in" in the RAM 13 as the value of the pinch state (S1004), and completes the processing.

Figure 10B:
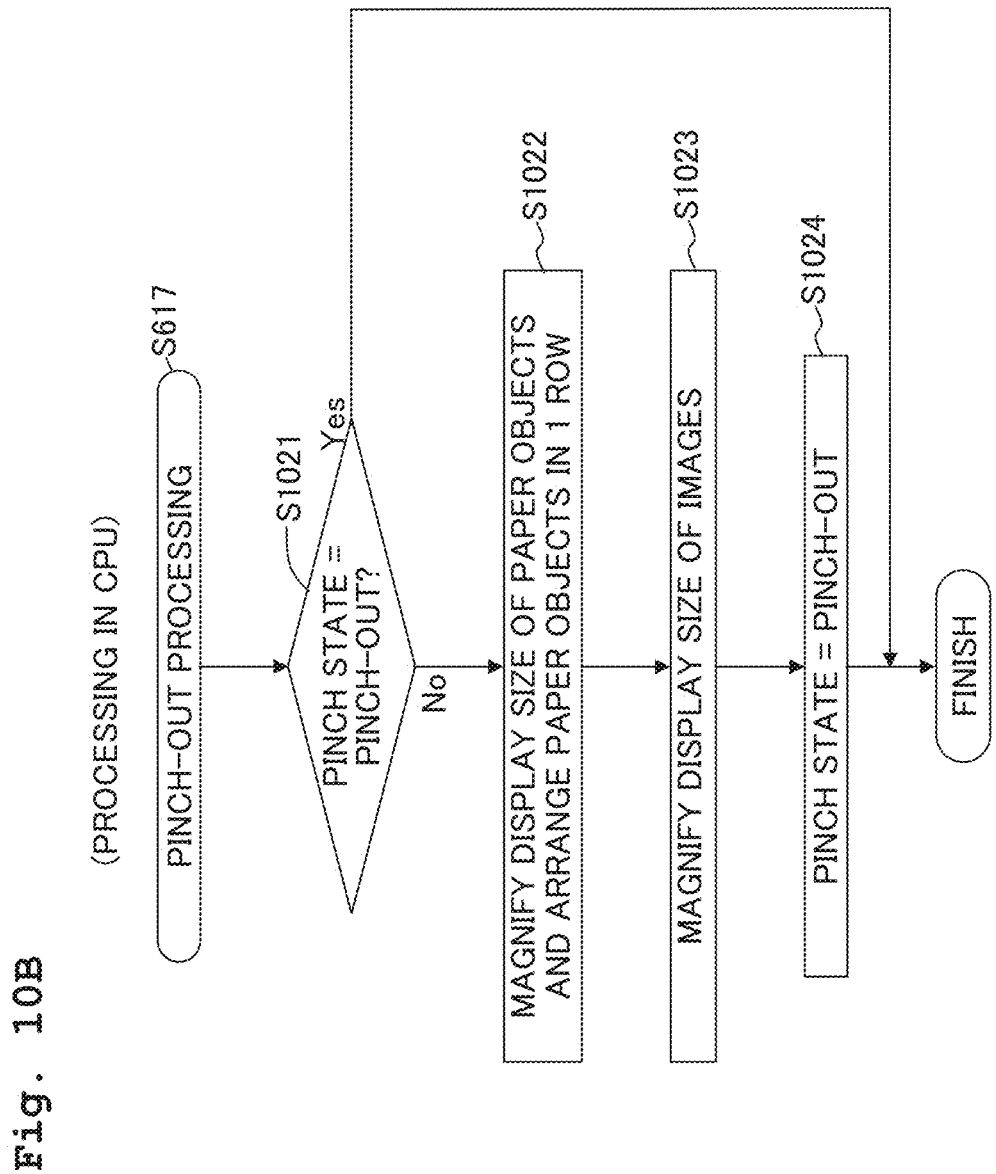

The processing shown in FIG. 10B is a processing of allowing magnified print preview images 60 to be displayed on the preview screen 50 in 1 row. At first, in a case that the pinch state stored in the RAM 13 is a value "pinch-out" indicating that the print preview images 60 are in a magnified state (S1021: YES), the print preview images 60 are already in the magnified state, and thus the CPU 11 completes the processing. On the other hand, in a case that the pinch state stored in the RAM 13 is a value "pinch-in" indicating that the print preview images 60 are in a reduced state (S1021: NO), the CPU 11 magnifies the display size of each of the paper objects 61 and displays the paper objects 61 in 1 row (S1022), and the CPU 11 magnifies the display sizes of the images 62 in accordance with the magnified display sizes of the paper objects 61 (S1023). Next, the CPU 11 stores "pinch-out" in the RAM 13 as the value of the pinch state (S1024), and completes the processing.

The processing shown in FIG. 10C is a processing of exchanging the display positions of two images 62 displayed on the preview screen 50, or a processing of exchanging the display positions of two print preview images 60 displayed on the preview screen 50. At first, the CPU 11 obtains the coordinates of the drop position (S1041), and searches the object of the drop position based on the obtained coordinates (S1042). Next, in a case that the starting position of the drag is in an image 62 and the drop position searched in Step S1042 is on another image 62 different from the image 62 from which the drag has started (S1043: Image, S1044: YES), the CPU 11 exchanges the display position of the image 62 having the drag start position and the display position of the another image 62 having the drop position (S1045), and completes the processing. Note that in Step S1045, the CPU 11 updates the arrangement information stored as the print setting 13*a*. On the other hand, in a case that in Step S1044 the drop position is not on the another image 62 different from the image 62 from which the drag has started (S1044: NO), the CPU 11 completes the processing.

On the other hand, in a case that the drag start position is in a margin area of a paper object 61 and the drop position searched in Step S1042 is on a margin area of another paper object 61 different from the paper object 61 from which the drag has started (S1043: Margin area, S1046: YES), the CPU 11 exchanges the display position of a print preview image 60 including the paper object 61 having the drag start position and the display position of the another print preview image 60 including another paper object 61 having the drop position (S1047), and completes the processing. Note that in Step S1045, the CPU 11 updates the page information stored as the print setting 13*a*. On the other hand, in a case that in S1046 the drop position is not on the margin area of the another paper object 61 different from the paper object 61 from which the drag has started (S1046: NO), the CPU 11 completes the processing.

According to the embodiment, as described above, the user can change the printing layout, the orientation of image, the orientation of print paper, the position of image, etc., while confirming the print preview images 60 displayed on the preview screen 50, with an easy and intuitive operation.

In the embodiment, the print control app 12*a* is an example of the image processing program; the tablet terminal 10 is an example of the image processing apparatus; the LCD 16 is an example of the display section; the CPU 11 is an example of the computer; the image 62 is an example of the image; the paper object 61 is an example of the rectangular area; the print preview image 60 is an example of the print preview image; the Rotate button 81 is an example of the paper orientation change button; the preview image display area 51 is an example of the preview image display area; the button display area 52 is an example of the button display area; the areas 61*a* to 61*d* are an example of the divided areas; the RAM 13 is an example of the storage section; the processing executed by the CPU 11 in Step S601 is an example of the image-obtain processing; the processing executed by the CPU 11 in Step S605 is an example of the display-control processing and the second display-control processing; the processings executed by the CPU 11 in Steps S611 and S612 are an example of the display-control processing; the processing executed by the CPU 11 in Step S609 is an example of the selection-judgment processing and the second selection-judgment processing; the processing executed by the CPU 11 in Step S702 is an example of the first update processing; and the processing executed by the CPU 11 in Steps S723 and S731 is an example of the second update processing.

The present teaching has been explained above based on the embodiment. The present teaching, however, is not limited at all only to the embodiment described above; and it is easily conceivable that various kinds of modifications, changes, etc., are possible within a range without deviating from the gist or essential characteristics of the present teaching.

For example, the embodiment has the configuration in which the print control app 12b is installed in the tablet terminal 10. However, the image processing apparatus installed with the print control app 12b is not limited to the tablet terminal 10 exemplified above, and it is possible to adopt, as the image processing apparatus installed with the print control app 12b, an information processing apparatus such as a personal computer, a portable terminal such as a smart phone, a digital camera, etc. Note that the image processing apparatus installed with the print control app 12b is not limited to a device which is capable of utilizing input from the touch panel 17, and it is allowable to configure that the input is executed by using a pointing device such as a mouse. Further, although the embodiment has the configuration in which the LCD 16 capable of displaying the preview screen 50 is provided on the tablet terminal 10 as the image processing apparatus. However, it is also allowable to configure that a display device such as an LCD capable of displaying the preview screen 50 is provided separately from the image processing apparatus. Furthermore, although the OS 12 installed in the tablet terminal 10 is exemplified by Windows 8 (trade name) in the embodiment, it is possible to use any OS other than Windows 8 (trade name).

The embodiment has the configuration in which when an image 62 included in the print preview image 60 is tapped, the tapped image 62 is rotated. However, it is also allowable to configure that when one image among a plurality of images displayed on a screen displaying a list of images is tapped, only the one image tapped is rotated, without rotating another image different from the one image tapped.

The embodiment has the configuration in which every time one image 62 is tapped, the one image 62 is rotated clockwise by 90 degrees each. However, it is allowable that the direction of rotation is counterclockwise; and that the angle of rotation with respect to one time of tapping is an angle different from 90 degrees, for example, 180 degrees, etc. Further, it is also allowable that in a case that one image 62 is touched and is subjected to a minute drag operation in a predetermined direction while being touched, the angle of rotation is determined depending on the drag direction. For example, it is allowable to configure that, in a case that one image 62 touched is dragged in the right direction, the one image 62 is rotated clockwise by 90 degrees; on the other hand, in a case that the one image 62 touched is dragged in the left direction, the one image is rotated clockwise by 270 degrees. Further, such a modification may be configured that, in a case that the one image 62 touched is drag in the down direction or up direction, the one image 62 is rotated by 180 degrees. According to such a modification, it is possible to rotate the image with a simple operation while specifying the angle of rotation for the image, thereby providing an excellent operability for selectively rotating one image.

Alternatively, it is allowable to configure that in a case that one image 62 is touched and is subjected to a minute drag operation in a predetermined direction while being touched, the direction of rotation and/or the angle of rotation are/is determined depending on the drag direction. For example, it is allowable to configure that, in a case that one image 62 touched is dragged in the right direction, the one image 62 is rotated clockwise by 90 degrees; on the other hand, in a case that the one image 62 touched is dragged in the left direction, the one image is rotated counterclockwise by 90 degrees. Further, such a modification may be configured that the direction of rotation is determined by the drag direction, and that the amount of rotation is determined depending on the drag length. According to such a modification, it is possible to rotate the image with a simple operation while specifying the angle of rotation for the image, thereby providing an excellent operability for selectively rotating one image.

Although the above-described embodiment has the configuration that in a case that the pinch-in operation is performed with respect to the preview screen 50, the print preview images 60 are reduced and displayed in 2 rows, it is also allowable to configure that as an operation amount of the pinch-in operation is greater, the print preview images 60 are more reduced to be displayed smaller, and are displayed in three or more display rows (three or more display columns). Further, although the embodiment is configured that the reduced print preview images 60 reduced by the pinch-in operation are displayed in 2 rows in the up/down direction, it is also allowable to configure that the reduced print preview images 60 are displayed in such a manner that number of display rows in the left/right direction is increased, such as 2 rows in the left/right direction. In a case that the rows of the print preview images 60 are aligned in the left/right direction, the dimension (size) of each of the print preview image 60 is made so as not to extend out of preview image display area 51 at least with respect to the left/right direction. Therefore, also in such a modification, the print preview image 60 does not extend off screen at least with respect to the left/right direction. Therefore, the user can easily confirm the print preview images 60.

Although the embodiment has the configuration in which the changing of layout (N-in-1) is executed based on the tapping operation with respect to the buttons 82 to 84 displayed on the preview screen 50, it is allowable to configure that a slide bar having a movable slider is displayed, and that the layout is changed depending on the position of the slider in the slide bar.

Note that each of the programs may be composed of a single program module, or may be composed of a plurality of program modules.

The program described above can be provided as a recording medium such as a CD-ROM, DVD, Blu-ray Disc, etc., or as a recording medium such as a hard disk drive installed in a computer, a memory disk, etc.

What is claimed is:

1. An non-transitory computer-readable medium storing an image processing program executable by a computer of an image processing apparatus including a display section configured to display a display screen on which output aspects of a plurality of images are editable, the image processing program comprising allowing the computer to execute: an image-obtain processing of obtaining a plurality of image data of a plurality of images;

a display-control processing of allowing the display screen to display images which are at least a part of the plurality of images based on the plurality of image data obtained by the image-obtain processing; and a selection-judgment processing of judging whether or not selection of one image among the images is received in a state that the images are displayed on the display screen by the display-control processing;

wherein in a case that the computer judges by the selection-judgment processing that the selection of the one image is received, the computer allows, in the display-control processing, the display screen to display another image in which the one image selected is rotated by a predetermined angle, instead of the one image which has been displayed on the display screen, in a state that output aspect of another image included in the images and different from the one image is maintained;

wherein in the display-control processing, the computer allows the display screen to display at least one print preview image in which at least one image among the images is arranged in a rectangular area corresponding to a print paper;

in the selection-judgment processing, the computer judges whether or not selection of one image among the at least one image arranged in the print preview image is received, in a state that the print preview image is displayed on the display screen;

in the display-control processing, the computer allows, on a condition that the computer judges by the selection-judgment processing that the selection of the one image is received, the display screen to display another print preview image in which the one image selected is rotated by the predetermined angle with respect to the rectangular area, instead of the print preview image which has been displayed on the display screen with the selected one image arranged in the rectangular area.

2. The computer-readable medium according to claim 1, wherein in a state that a print preview image in which images among the plurality of images are arranged in the rectangular area is displayed on the display screen, the computer judges in the selection judgment processing whether or not the selection of one image among the images arranged in the rectangular area is received;

in a case that the computer judges by the selection-judgment processing that the selection of the one image is received, the computer allows, in the display-control processing, the display screen to display another print preview image in which the one image selected is rotated by the predetermined angle with respect to the rectangular area, while maintaining display aspect of another image included in the images arranged in the rectangular area and different from the one selected image, instead of the print preview image which has been displayed on the display screen and arranged with the selected one image.

3. The computer-readable medium according to claim 1, wherein in a case that the computer judges by the selection judgment processing that the selection of the one image is received, the computer allows, in the display-control processing, the display screen to display another print preview image in which the selected one image rotated by the predetermined angle with respect to the rectangular area is magnified or reduced in accordance with the rectangular area and arranged in the rectangular area.

4. The computer-readable medium according to claim 1, wherein the image processing program further comprises allowing the computer to execute:

a second display-control processing of allowing the display screen to display a paper orientation change button configured to change orientation of the print paper; and a second selection-judgment processing of judging whether or not selection of the paper orientation change button is received;

wherein in a case that the computer judges by the second selection judgment processing that the selection of the paper orientation change button is received, the computer allows, in the display-control processing, the display screen to display another print preview image in which the rectangular area is rotated with respect to the at least one image arranged in the rectangular area by an angle corresponding to the orientation of the print paper changed by the paper orientation change button, instead of the print preview image which has been displayed on the display screen.

5. The computer-readable medium according to claim 4, wherein the print preview image includes a plurality of print preview images in each of which at least one image among the plurality of images is arranged in the rectangular area;

in a case that the computer judges by the second selection judgment processing that the selection of the paper orientation change button is received, the computer allows, in the display control-processing, the display screen to display other print preview images, regarding all of the print preview images, in each of which the rectangular area is rotated with respect to the at least one image arranged in the rectangular area by the angle corresponding to the orientation of the print paper changed by the paper orientation change button, instead of all of the print preview images which have been displayed on the display screen.

6. The computer-readable medium according to claim 4, wherein the display screen has a preview image display area in which the print preview image is displayed and a button display area in which at least the paper orientation change button is displayed;

in the display-control processing, the computer allows the print preview image to be displayed in the preview image display area;

in the second display-control processing, the computer allows the paper orientation change button to be displayed in the button display area;

in a case that one image among images which are included in the plurality of images and displayed in the preview image display area is selected, the computer judges in the selection-judgment processing that selection of the one image is received; and in a case that the paper orientation change button displayed in the button display area is selected, the computer judges in the second selection judgment processing that the selection of the paper orientation change button is received.

7. The computer-readable medium according to claim 4, wherein in a case that the computer judges by the second selection-judgment processing that the selection of the paper orientation change button is received, the computer allows, in the display-control processing, the display screen to display another print preview image in which the at least one image arranged in the rotated rectangular area is magnified or reduced in accordance with the rectangular area rotated by the angle corresponding to the orientation of the print paper changed by the paper orientation change button.

8. The computer-readable medium according to claim 4, wherein the rectangular area is formed of a plurality of divided areas obtained by dividing the rectangular area into a plurality of portions so as to arrange images among the plurality of images in the rectangular area;

the plurality of divided areas have arrangement order by which the images are arranged in the plurality of divided areas respectively in accordance with rotation of the rectangular area with respect to the images; and in a case that the images are arranged in the rectangular area, the computer allows in the display-control processing the display screen to display a print preview image in which the images are arranged in the plurality of divided areas, respectively, forming the rectangular area, based on the arrangement order; and in a case that the computer judges by the second selection judgment processing that the selection of the paper orientation change button is received, the computer allows in the display-control processing the display screen to display another print preview image in which the rectangular area is rotated by the predetermined angle with respect to the images arranged in the plurality of divided areas respectively and in which the images are arranged in the plurality of divided areas forming the rectangular area rotated by the predetermined angle so that the arrangement order of the images in the plurality of divided areas forming the rectangular area are same before and after the rotation of the rectangular area.

9. The computer-readable medium according to claim 4, wherein in the display-control processing, the computer allows the display screen to display the print preview image in accordance with print setting information stored in a storage section and the image processing program further comprising allowing the computer to execute:
  a first update processing of updating the print setting information by allowing the storage section to store rotation information corresponding to rotation of the selected one image by the predetermined angle with respect to the rectangular area, in a case that the computer judges by the selection judgment processing that the selection of the one image is received; and
  a second update processing of updating the print setting information by allowing the storage section to store paper orientation information corresponding to the orientation of the print paper changed by the paper orientation change button, in a case that the computer judges by the second selection judgment processing that the selection of the paper orientation change button is received.

10. The computer-readable medium according to claim 1, wherein the display section includes a touch panel; and
  in a case that in the selection-judgment processing, approach toward or contact with a detection area, of the touch panel, corresponding to the one image displayed on the display screen is detected, the computer judges that the selection of the one image is received.

11. A non-transitory computer-readable medium storing an image processing program executable by a computer of an image processing apparatus including a display section configured to display a display screen on which output aspects of a plurality of images are editable,
  the image processing program comprising allowing the computer to execute: an image-obtain processing of obtaining a plurality of image data of a plurality of images;
  a display-control processing of allowing the display screen to display images which are at least a part of the plurality of images based on the plurality of image data obtained by the image-obtain processing; and
  a selection-judgment processing of judging whether or not selection of one image among the images is received in a state that the images are displayed on the display screen by the display-control processing;
  wherein in a case that the computer judges by the selection-judgment processing that the selection of the one image is received, the computer allows, in the display-control processing, the display screen to display another image in which the one image selected is rotated by a predetermined angle, instead of the one image which has been displayed on the display screen, in a state that output aspect of another image included in the images and different from the one image is maintained;
  wherein the display section includes a touch panel; and
  in a case that in the selection-judgment processing, approach toward or contact with a detection area, of the touch panel, corresponding to the one image displayed on the display screen is detected and that a continuous input to the touch panel moving from a position at which the approach toward or contact with the detection area is detected is detected, the computer judges that the selection of the one image is received; and
  in a case that the computer judges by the selection-judgment section that the selection of the one image is received, the computer allows in the display-control processing the display screen to display another image in which the selected one image is rotated by a predetermined angle according to a direction of the continuous input, instead of the one image which has been displayed on the display screen, in a state that output aspect of another image among the images and different from the selected one image is maintained.

12. An image processing apparatus comprising:
  a display section configured to display a display screen on which output aspects of a plurality of images are editable;
  a controller configured to:
    obtain a plurality of image data of a plurality of images;
    allow the display screen to display at least images which are a part of the plurality of images based on the plurality of image data obtained; and
    judge whether or not selection of one image among the plurality of images is received in a state that the plurality of images are displayed on the display screen;
  wherein in a case that the controller judges that the selection of the one image is received, the controller allows the display screen to display another image in which the selected one image is rotated by a predetermined angle, instead of the one image which has been displayed on the display screen, in a state that output aspect of another image among the images and different from the one image is maintained
  wherein, the controller allows the display screen to display at least one print preview image in which at least one image among the plurality of images is arranged in a rectangular area corresponding to a print paper;
  the controller judges whether or not selection of one image among the at least one image arranged in the print preview image is received, in a state that the print preview image is displayed on the display screen;
  the controller allows, on a condition that the controller judges that the selection of the one image is received, the display screen to display another print preview image in which the one image selected is rotated by the predetermined angle with respect to the rectangular area, instead of the print preview image which has been displayed on the display screen with the selected one image arranged in the rectangular area.

\* \* \* \* \*